United States Patent
Lord et al.

(10) Patent No.: US 7,392,264 B2
(45) Date of Patent: *Jun. 24, 2008

(54) DATA REFERENCING WITHIN A DATABASE GRAPH

(75) Inventors: Robert William Lord, Seattle, WA (US); Christopher Allen Suver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 398 days.

This patent is subject to a terminal disclaimer.

(21) Appl. No.: 11/046,723

(22) Filed: Jan. 31, 2005

(65) Prior Publication Data

US 2005/0151738 A1    Jul. 14, 2005

Related U.S. Application Data

(63) Continuation of application No. 10/685,225, filed on Oct. 14, 2003, which is a continuation of application No. 09/583,427, filed on May 31, 2000, now Pat. No. 6,665,863.

(51) Int. Cl.
   *G06F 17/30* (2006.01)
(52) U.S. Cl. .................... 707/104.1; 707/3; 717/144
(58) Field of Classification Search ................ 707/1–3, 707/5–6, 100, 102, 103, 104.1; 717/144
See application file for complete search history.

(56) References Cited

U.S. PATENT DOCUMENTS

| | | | |
|---|---|---|---|
| 5,297,279 A | 3/1994 | Bannon et al. | |
| 5,410,705 A | 4/1995 | Jones et al. | |
| 5,530,957 A | 6/1996 | Koenig | |
| 5,680,530 A | 10/1997 | Selfridge et al. | |
| 5,801,687 A | * 9/1998 | Peterson et al. | 715/500.1 |
| 5,913,064 A | 6/1999 | Chen | |
| 6,047,280 A | * 4/2000 | Ashby et al. | 707/2 |
| 6,063,128 A | 5/2000 | Bentley et al. | |
| 6,086,619 A | 7/2000 | Hausman et al. | |
| 6,171,109 B1 | 1/2001 | Ohsuga | |

(Continued)

OTHER PUBLICATIONS

"Automatically Generating Visual Syntax-Directed Editors", Arefi et al., Computing Practices, Communications of the ACM, Mar. 1990, vol. 33, No. 3, pp. 349-360.

(Continued)

*Primary Examiner*—Leslie Wong
(74) *Attorney, Agent, or Firm*—Lee & Hayes, PLLC

(57) ABSTRACT

The present invention is directed to providing a higher degree of association between nodes and links in a graph by creating data structures (spiders) that provide views into graphs that transcend the relatively static association of a conventional graph. A spider's variables bind to any number of nodes and links in the graph, enabling all of the bound nodes and links by addressing the spider. By adding constraints on the extent or degree of binding in a spider to a graph, a subset of the graph is identified. The spider can then used to address the subset of the graph as constrained by the spider. A spider can bind to a link in order to identify a parent/child structural subset of the graph. More specifically a spider is a collection of variables that create a template or pattern and bind to the nodes and links in the graph. A spider traverses a graph by binding its variables to various nodes and links in the graph.

3 Claims, 16 Drawing Sheets

U.S. PATENT DOCUMENTS

| | | | |
|---|---|---|---|
| 6,256,649 B1 * | 7/2001 | Mackinlay et al. | 715/503 |
| 6,377,287 B1 | 4/2002 | Hao et al. | |
| 6,476,833 B1 | 11/2002 | Moshfeghi | |
| 6,509,898 B2 * | 1/2003 | Chi et al. | 345/440 |
| 6,587,844 B1 * | 7/2003 | Mohri | 706/20 |
| 6,725,227 B1 * | 4/2004 | Li | 707/102 |
| 2001/0034733 A1 | 10/2001 | Prompt et al. | |

OTHER PUBLICATIONS

Micallef, et al., "Support Algorithms for Incremental Attribute Evaluation of Asynchronous Subtree Replacements", IEEE Transactions on Software Engineering, vol. 19, No. 3, Mar. 1993, IEEE, pp. 231-246.

* cited by examiner

US 7,392,264 B2

DATA REFERENCING WITHIN A DATABASE GRAPH

RELATED APPLICATIONS

This application is a continuation of U.S. patent application Ser. No. 10/685,225, filed Oct. 14, 2003, which is a continuation of U.S. patent application Ser. No. 09/583,427, filed May 31, 2000, which issued on Dec. 16, 2004 as U.S. Pat. No. 6,665,863. This application claims priority to U.S. patent application Ser. No. 09/583,427, filed May 31, 2000. These patent application Ser. Nos. 10/685,225 and 09/583,427 are incorporated herein by reference.

FIELD OF THE INVENTION

This invention relates generally to graphs, and more particularly to a mechanism for providing a high degree of abstraction of graphs.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, Microsoft Corporation, All Rights Reserved.

BACKGROUND OF THE INVENTION

A table in a relational database is used to organize pieces of information having similar attributes and meaning. An example would be an address table. Typical properties of an address are street number, street name, city, state, country and postal code. Such an address table has the ability to organize each of these properties as a column and allocate a single row for each address. A database cursor is useful because it has the ability to be positioned on a given row for the purposes of examining, modifying or deleting a particular address from the table. Given a position, such a cursor can also be used to traverse or navigate the addresses in the table, for example, in order of ascending postal code, or ascending city name.

In comparison, a graph is a more general-purpose data structure than a table, yet the same ease of use of navigating a database has not been available to graphs. In the previous example, the address table cannot be readily used to store addresses which do not share the typical structure (e.g., a P.O. Box) assumed by the address table. A graph is composed of nodes and links between those nodes. Nodes have the ability to contain a value. Links and nodes have one type. Using this common data structure, any piece of information may be represented, including the address table described above. In a graph however, the concept of a row indicating the "boundaries" of each address is not present. The cursor concept of having exactly one street number for each address row is no longer valid. In a graph, an address may well have zero or two or five thousand street numbers.

A graph is a set of nodes and links. Each node is an object with relations to other objects, such as pointers to other nodes, and properties, such as attributes and/or data. A tree is a special form of a graph in which there are no cycles, such as circular references. Graphs provide a generalized means of storing data in which the nodes of data are associated by links.

Each node has a type and a value. However, to conventionally address a subset of a graph requires a node-by-node traversal with no abstraction of subsets of the graph. Navigation and traversal of the graph is time-consuming and keeping track of which part of the graph has been navigated is complex. Furthermore, the association of links is not very flexible and the low-degree of association limits the usefulness of the information. In a directed graph, the links have a direction, from one node to another. In a labeled graph, the links and/or the nodes bear a label that identifies them.

FIG. 1 is a block diagram illustrating a conventional exemplary graph 100. The graph includes a number of linked nodes. The links represent relationships.

More specifically, node of 110 contains no text data, but does contain a link to node 120. The relationship between the node 110 and node 120 is that node of 110 is of relationship1 to node 120, and node 110 contains a link to node 130. The relationship between the node 110 and node 130 is that node of 110 is of relationship2 to node 130. Furthermore, node 110 contains a link to node 140. The relationship between the two nodes 110 and 140 is that node of 110 has relationship3 node 140. Moreover, node 110 contains a link to node 150 in which the relationship between the two nodes is that node of 110 has relationship3 to node 150. In addition, node 110 contains a link to node 160 in which the relationship between the two nodes is that node of 110 has relationship3 to node 160. Continuing, node 110 contains a link to node 170 which the relationship between the two nodes is that node of 110 has relationship3 to node 170, and node 110 contains a link to another node 180, the relationship between the two nodes is that node of 110 has relationship3 to another node 180.

In object-oriented implementations of graph 100, each of the nodes is an object, of the class that the node is named for, such as "type1" or "type2."

Continuing, node 140 is related by relationship4 to node 185. In addition, node 150 has a "type 6" node 190 and "type 3" node 150 has a "type 7" node 195.

In a graph, each piece of information is stored only once, in a node. A node that has a relationship with the information, will have a link to the node that contains the information. Therefore, there is no duplicated information. For example, "type1" node 130 has a link to "type 5" node 170, and "type1" node 110 has relationship3 to link to "type 5" node 170. Therefore, the "type 5" node 170 information is stored in one location, node 170, and is referenced from all required nodes, which eliminates duplication of the node 170 information.

The present invention solves the problem of precisely navigating or querying graph 100 so that unwanted data that does not fit the criteria of the search is not retrieved, and that all wanted data is retrieved. The present invention enables a pattern to be identified or generated, and enable the pattern to be located within the graph 100. For example, if locating in the graph 100 all employees which have a specific first name and that which have a specific type 5 is desired, then a pattern such as the pattern in FIG. 3 is generated and used to generate a spider in FIG. 4. The spider in FIG. 4 navigates and/or queries the graph in FIG. 1.

SUMMARY OF THE INVENTION

A spider is used to reference a subset of data contained in a graph data structure. The spider may be described as having many legs, each touching exactly one node or link in the graph. Each leg has the ability to be raised to inspect what is underneath and the legs have the ability to be moved according to rules programmed into the spider. Collectively, these legs represent a position within the graph. To continue the example, to be "positioned" on an address that has five thousand street numbers, the spider would have five thousand legs, each one touching one of the street number nodes in the graph. Based on the spider leg position, that complex address could then be examined, modified or deleted, just like a row indicated by a cursor in a conventional database table.

A conventional database row set cursor keeps track of the current position in a result set returned by a database query. In contrast, in the present invention, a cursor keeps track of the current position in a directed labeled graph (DLG). This is distinguished from keeping track of a position in a conventional database row set, because the graph over which a cursor operates can have an arbitrarily complex shape. Further, in the present invention, navigation can be on any of the spiders "legs", whereas in a traditional cursor the navigation is limited to whole rows.

A cursor object is commonly created with a constraint graph that defines the subset of the graph over which the cursor object can traverse. A cursor object that has no constraint graph can access any schema or instance data in the spider.

In one aspect of the invention a DLG that consists of any one or all of conceptual schemas, metaschemas, and instance data is managed by generating a cursor of the directed labeled graph and navigating through the directed labeled graph using the cursor.

In another aspect of the invention a graph is managed by generating a cursor of the graph and navigating through the graph using the cursor. The cursor is associated with a constraint graph that identifies a subset of the collection. The constraint graph is created or generated by obtaining a handle to a required namespace node, which yields a namespace handle, obtaining a handle to a variable using the namespace handle, determining the identity of each of a number of nodes and links associated with the namespace handle, obtaining a handle to each of nodes and links using the namespace handle, generating a segment which includes creating a second cursor in which the variable is bound to one of the nodes and links, and storing the segment.

In yet another aspect of the invention, a data structure includes a linked list that has a number of nodes and links. The linked list is a graph that is a collection of variables bound to the nodes and links in using a restriction. The restriction is a constraint graph.

In still yet another aspect of the invention, a computerized system includes a directed labeled graph, an annotated schema runtime engine operably coupled to the directed labeled graph and a spider apparatus operably coupled to the annotated schema runtime engine, in which the spider interface includes at least one variable bound to a node or a link in the directed labeled graph, an annotated schema runtime engine, and interface to an annotated schema runtime engine cursor component.

Systems, clients, servers, methods, and computer-readable media of varying scope are described herein. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular object-oriented implementation of the invention is described. Finally, in the fifth section, a conclusion of the detailed description is provided.

Herein, references to "spider" is short for "spider cursor". In addition, the "cursor object" described herein may also be called the "spider cursor."

Hardware and Operating Environment

Figure 2:
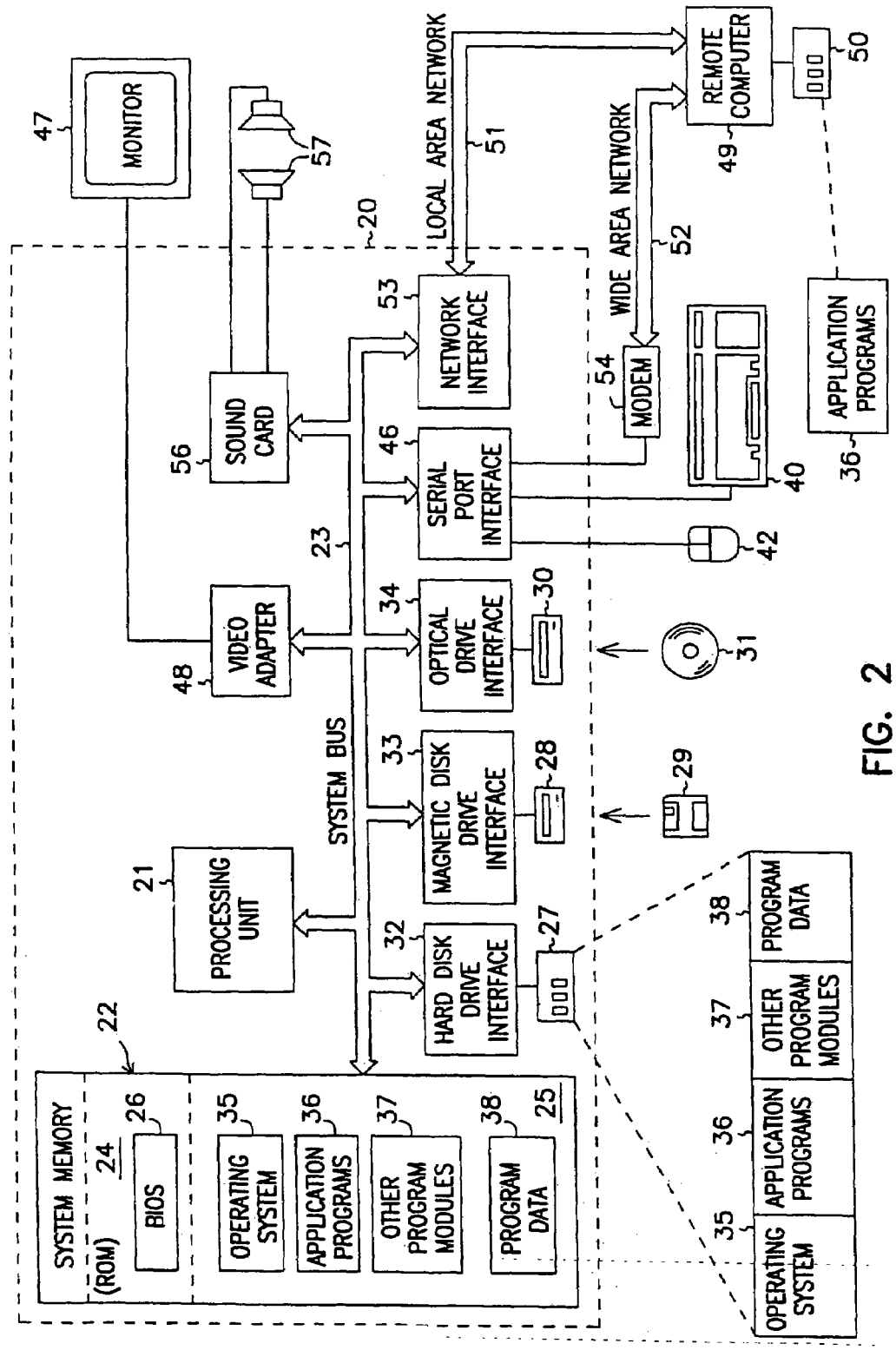
FIG. 2 is a block diagram of the hardware and operating environment in conjunction with which embodiments of the invention may be practiced.

FIG. 2 is a diagram of the hardware and operating environment in conjunction with which embodiments of the invention may be practiced. The description of FIG. 2 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 2 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 2. The logical connections depicted in FIG. 2 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIG. 3 and FIG. 4. A spider has at least one a variable that binds to nodes or links in a graph as represented by spider leg, instead of, figuratively speaking "stepping on them." A variable is a special kind of node that has the ability to be bound other nodes or links for the purpose of navigating through the graph, creating and detaching nodes and links, and storing and retrieving data. By default, a variable has the ability to be bound to any node or link, within the context of a particular cursor object. However, variables cannot be bound outside of a cursor object. In order to direct a search through the graph, it is often useful to place restrictions on the types of instances to which a particular variable can bind. One kind of restriction is a type constraint. A variable with a type constraint can only be bound to a node or link of the same type as its constraint indicates.

This overview illustrates a graph with no circular references. However the invention is not limited to a graph with no circular references. The invention is also useful in tree structures that have circular references. Rules programmed into the spider are restrictions on those variable bindings. Constraints on variables specify the shape of the information retrieved from a query. Constraints on a graph cursor object specify value restrictions. A constraint graph serves a similar purpose to the SELECT and WHERE statements in a SQL command that constrain the scope of the result set. However, while a SQL command returns a rowset from only specific information for which is queried, a graph cursor object can traverse any subgraph that does not conflict with any of the constraints in the cursor object's constraint graph. A client can also use a graph cursor object to explore a relation that the client had no prior knowledge of.

The present invention solves the problem of precisely navigating or querying graph 100 so that unwanted data that does not fit the criteria of the search is not retrieved, and that all wanted data is retrieved. The present invention enables a pattern to be identified or generated, and the pattern to be located within the graph 100. For example, if locating in the graph 100 all employees which have a specific first name and that which have a specific type5 is desired, then a pattern such as the pattern in FIG. 3 is generated and used to generate a spider in FIG. 4. The spider in FIG. 4 navigates and/or queries the graph in FIG. 1.

Figure 3:
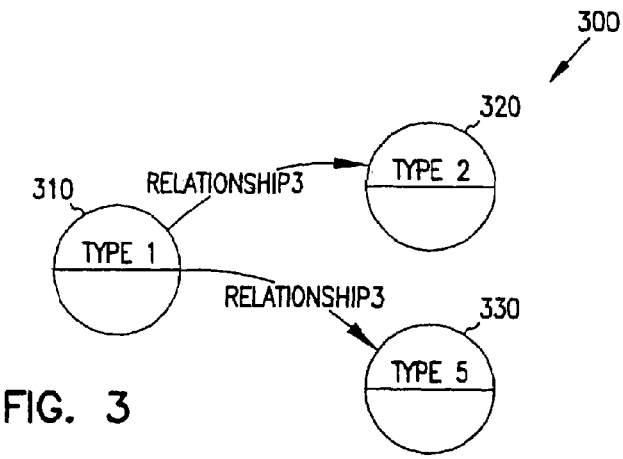
FIG. 3 is a block diagram illustrating a system-level overview of an exemplary embodiment of a pattern of the invention.

FIG. 3 is a block diagram illustrating a system-level overview of an exemplary embodiment of a pattern 300 of the invention.

Navigation pattern 300 is an association or a relationship of a "type1" node 310 to a "type2" node 320 and a "type5" node 330. More specifically, the "type1" node 310 has relationship3 to "type2" node 320 and has relationship3 to "type5" node 330.

Figure 4:
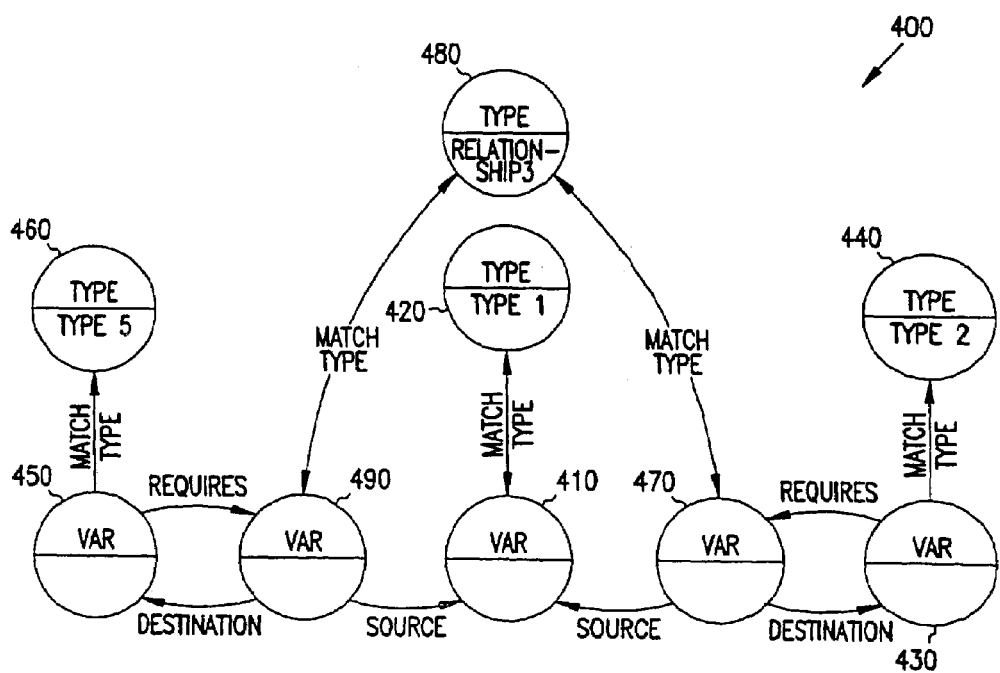
FIG. 4 is a block diagram illustrating a system-level overview of an exemplary embodiment of a spider of the invention.

FIG. 4 is a block diagram illustrating a system-level overview of an exemplary embodiment of a spider 400 of the invention. Spider 400 represents pattern 300. In the creation of spider 400 from pattern 300, a number of variables are generated, one variable for each of the nodes in the pattern, and one variable for each of the relationships in the pattern.

More specifically, a variable 410 is generated to represent node 310 in pattern 300. Node 410 is linked or associated with node 420 containing data. The link or association is defined as a match type, indicating that spider 400 represents a pattern which matches a node of "type1" type.

Furthermore, in the creation of spider 400 from pattern 300, a variable 430 is generated to represent node 320 in pattern 300. Node 430 is linked or associated with node 440 containing data "type2" and the link or association is defined as a match type, indicating that spider 400 represents a pattern which matches a node of "type2" type.

In addition, in the creation of spider 400 from pattern 300, a variable 450 is generated to represent "type5" node 330 in pattern 300. Node 450 is linked or associated with "type" node 460 containing data "type5" and the link or association is defined as a match type, indicating that spider 400 represents a pattern which matches a node of "type5" type.

In addition, in the creation of spider 400 from pattern 300, a variable 470 is generated to represent the relationship between node 310 and node 320 in pattern 300. Node 470 is linked or associated with "type" node 480 with a link or association is defined as a match type, indicating that spider 400 represents a pattern which matches relationship3. Furthermore, variable 470 is linked, associated or related to variable 410 in the spider with a "source" link, association or relationship to indicate that the source of relationship3 that variable 470 represents in pattern 300 is variable 410 which represents the "type1" node in pattern 300. Also, variable 470 is linked, associated or related to variable 430 in the spider with a "requires" link, association or relationship, and a "destination" link, association or relationship to indicate that the source of the "destination" of the variable 470 is variable 430 which represents the "type2" node in pattern 300.

In addition, in the creation of spider 400 from pattern 300, a variable 490 is generated to represent the relationship3 between node 310 and node 330 in pattern 300. Node 490 is linked or associated with "type" node 480 and the link or association is defined as a match type, indicating that spider 400 represents a pattern which matches relationship3. Furthermore, variable 490 is linked, associated or related to variable 410 in the spider with a "source" link, association or relationship to indicate that the source of relationship3 that variable 490 represents in pattern 300 is variable 410 which represents the "type1" node in pattern 300. Also, variable 490 is linked, associated or related to variable 430 in the spider with a "requires" link, association or relationship, and a "destination" link, association or relationship to indicate that the source of the "destination" of the variable 490 is variable 430 which represents the "type5" node in pattern 300.

The system level overview of the operation of an exemplary embodiment of the invention has been described in this section of the detailed description. The spider provides a high level abstraction of a linked list structure. While the invention is not limited to any particular graph or linked list structure, for sake of clarity a simplified graph has been described.

Methods of an Exemplary Embodiment of the Invention

In the previous section, a system level overview of the operation of an exemplary embodiment of the invention was described. In this section, the particular methods performed by the server and the clients of such an exemplary embodiment are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods to be performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media).

Terminology from the People, Places, and Time (PPT) conceptual schema is used in examples. The PPT is a general-purpose schema that is used as a base for many other schemas. A pattern is a graph that represents a complex type. The type represented by a pattern is either an entity or a relation. A pattern is distinguished from a simple entity or relation in that a pattern has an intrinsic structure, while a entity or relation does not have an intrinsic structure. Patterns are identified by their root nodes, which makes it possible to treat a pattern as if it were a single entity or relation. A pattern can have multiple root nodes. Patterns have the ability to be nested, and they support inheritance and polymorphism. The PPT conceptual schema defines a number of entities and relations that are useful across a broad range of applications. The PPT conceptual schema consists of entities, relations, and values. An entity can either be a type, such as a part of a schema, or an instance of a type. Schema and instance data are treated identically. Instances can, but do not have to, have values associated with them. A value is a constant, a number, a text string, a Boolean value, etc. Relations provide the context that associates entities and values with one another in a meaningful fashion. SCORE treats schema and instance data identically. Instances can, but do not have to, have values associated with them. A relation describes the relationship between two entities, an entity and a relation, or two relations. Relations provide the context that associates entities and values with one another in a meaningful fashion.

Entities are used to represent anything from an abstract concept, such as a type, to a concrete object, such as an instance. Every named entity must have a name that is unique within its namespace. Entity names are usually nouns. Entities can have supertypes, which is a type from which the entity is derived, and subtypes, which is a type that is derived from the entity. An entity can also have a datatype associated with it. The datatype, if present, determines the default storage type of any values assigned to instances of that entity. This makes it possible for a client to request the data type of a query result, and to do type conversions if the client wants data returned in a different format. If no datatype attribute is associated with an entity, the default data type is string.

Entities are always represented as nodes in an ASR graph.

To extend a schema, or construct a new schema, and create a new type of entity, one would construct a graph like the following one, possibly omitting the datatype and/or the supertype relation. After defining the new entity type, the new type can be used and manipulated exactly as any predefined entity type.

Three core relations can exist between two entities. The relations are subtype, supertype, and rejects. The subtype relation is the inverse of the supertype relation. If entity B is derived from entity A, then entity B has a subtype relation to entity A, and entity A has a supertype relation to entity B. A subtype inherits all the properties of its supertype. When a client requests all instances of a supertype, all instances of all of its subtypes are returned, as well. The rejects relation between two entities means that the two types are mutually exclusive. A new type cannot inherit from both types.

A relation describes the relationship between two entities, an entity and a relation, or two relations. Like an entity, a relation must have a name. The name belongs to a namespace and is used to identify the relation. Relation names are usually verbs. Unlike an entity, a relation also must have a source_type link and a destination_type link. All relations in the ASR graph are directed. The source_type link specifies the type of entity or relation from which this relation originates, which is its domain). The destination_type link specifies the type of entity or relation that is the destination of this relation (its range).

Similar to entities, relations can have supertypes (a type from which the relation is derived) and subtypes (a type that is derived from the relation).

Two different graphical notations are used to represent relations. The most common representation of a relation, in the context of a schema or pattern, is as a directed, labeled edge between two nodes. A relation can also be represented as a node itself, however. This representation is useful when discussing properties of a specific relation. The source_type, dest_type, supertype, and has relations are represented as edges coming from the relation. In_namespace is also represented as an edge.

Entities are always represented as nodes. A relation can have either an entity or another relation as its source or its destination. It is never necessary to link a relation to another relation to model a concept, but it can sometimes be convenient. There are three basic types of constraint relations: a relation between a variable and a type (e.g. match_type and match_instance), a relation between two variables (e.g. fetch_type, fetch_source, fetch_destination, requires, and forbids), and a relation between an operator and an operand (e.g. left and right). The constraint relations are for building spider patterns. The match_type relation specifies that a variable at the source of the match_type link can only bind to the node or link of the type of subtype specifying and/or matching the type at the destination end of the match_type link. The destination node or link must represent a type in a schema, not an instance of a type. The match_instance relation specifies that the node (or link) to which the variable at the source of the match_instance relation is bound must be the instance at the destination of the match_instance relation.

Figure 1:
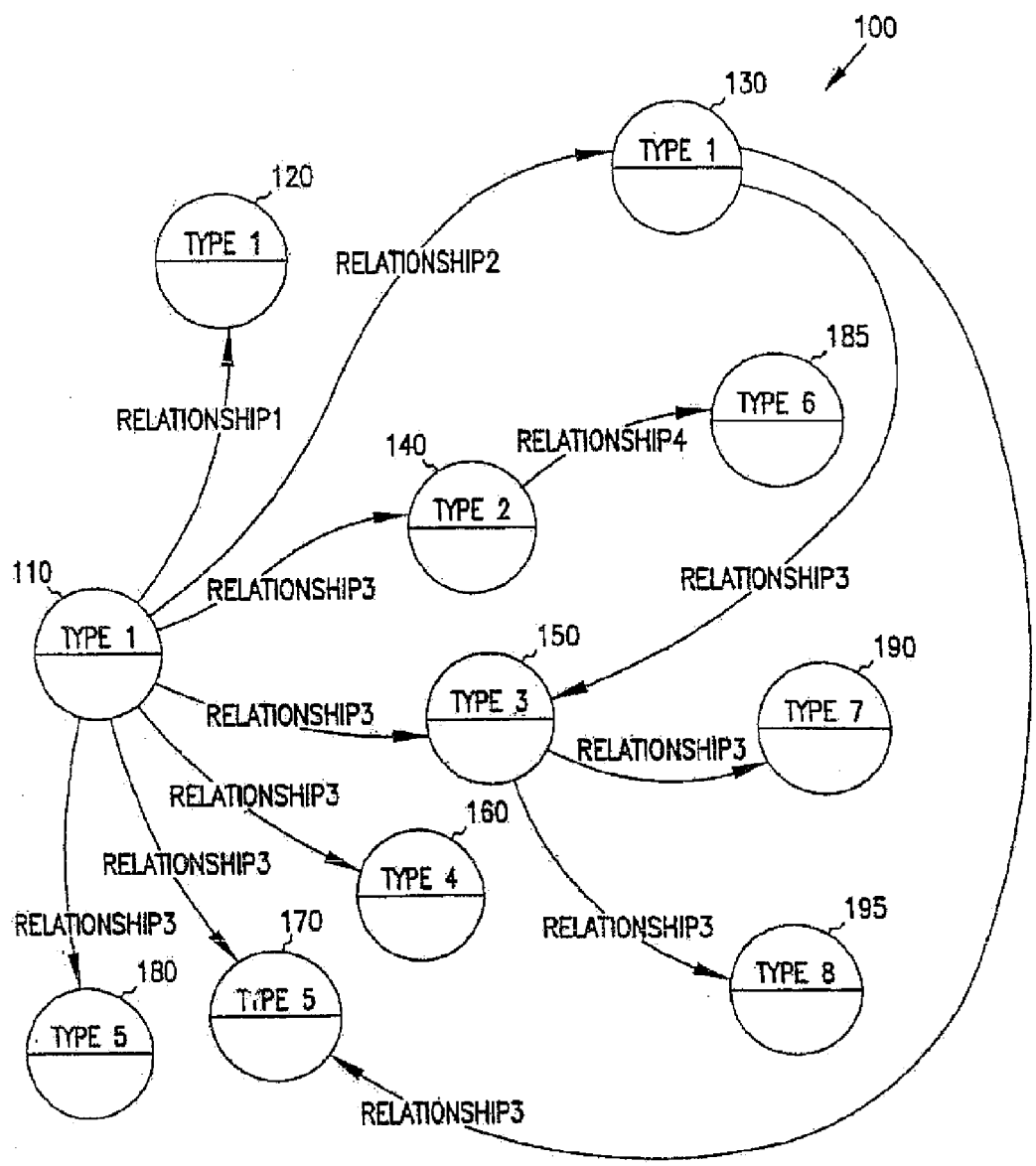
FIG. 1 is a block diagram illustrating a conventional exemplary graph.
Figure 5:
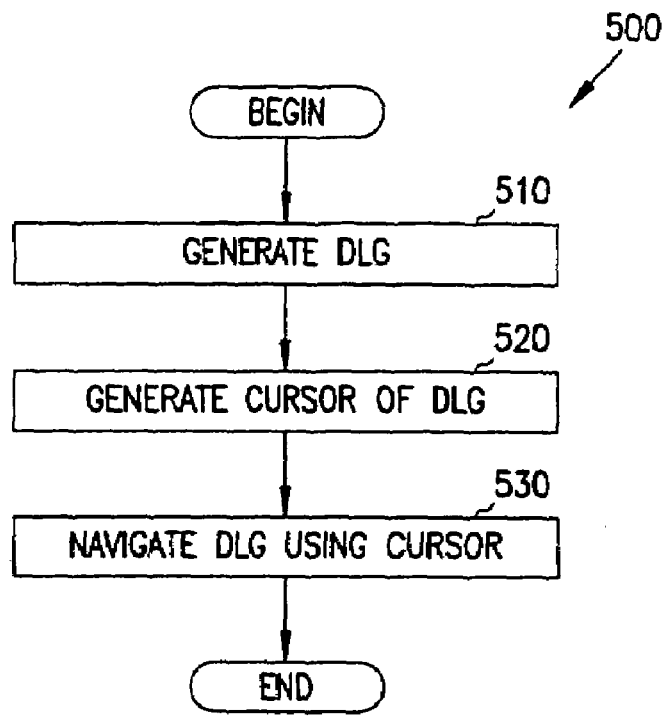
FIG. 5 is a flowchart of a method according to an exemplary embodiment of the invention.

Referring first to FIG. 5, a flowchart of a method to be performed by a computer, such as computer 20 in FIG. 1, according to an exemplary embodiment of the invention, is shown.

Method 500 is a method for maintaining and managing metaschema, schema, and instance data as a single directed labeled graph (DLG). Method 500 starts with generating a directed labeled graph 510. The directed labeled graph is generated from conceptual schemas, metaschemas, and instance data. A schema is a model of a particular type of information structure. For example, logical and physical schemas are used in database design to model the logical and physical architecture of a database. A metaschema is a schema that represents the rules for creating acceptable schemas. For example, a conceptual metaschema is a schema for creating conceptual schemas. Instance data is data that is relevant to a specific instance of a type, rather than to the type itself. For example, instance data includes character strings, pointers, integers and floating point data. A DLG is a graph consisting of nodes and directed edges. Every edge has a direction that includes a source and a target, and a label describing its purpose.

Method 500 also includes generating a cursor of the DLG 520 by associating nodes with a spider. The cursor enables access to the nodes of the DLG. Thereafter, the nodes of the DLG are navigated or traversed using the cursor by iterating through the nodes of the cursor or spider 530. Thereafter, the method ends.

Figure 6:
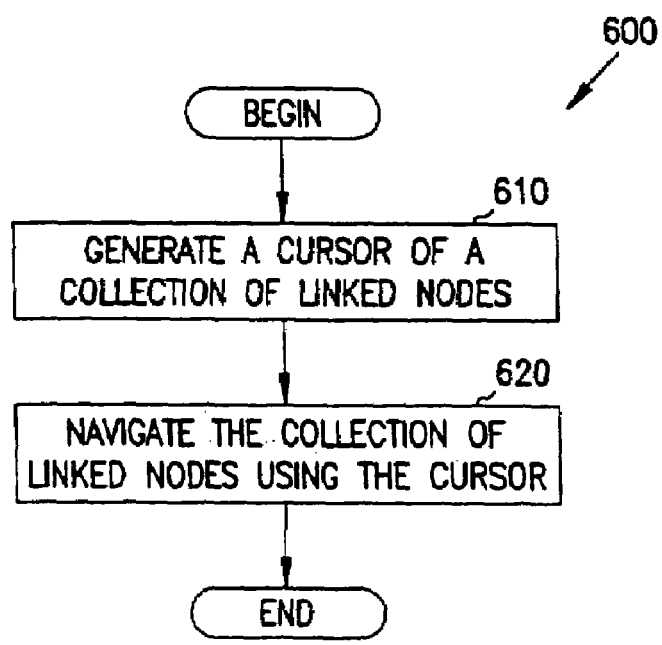
FIG. 6 is a flowchart of a method according to an exemplary embodiment of the invention.

Referring next to FIG. 6, a flowchart of a method to be performed by a computer, such as computer 20 in FIG. 2, according to an exemplary embodiment of the invention, is shown.

Method 600 manages a graph. The method 600 starts with generating a cursor of the graph 610. The cursor is generated with restriction, such as a graph that is bound only to nodes in the graph of type "city" having the value of "Seattle" in FIG. 2, or without restriction. Where the cursor is generated with no restriction, all nodes in the graph are navigable. Where the cursor is generated with restriction, a constraint graph is used to express the restriction. The constraint graph is a generated graph with at least one constraint on the management of the graph that identifies a subset of the graph that are desired to be navigable. The cursor is associated with the constraint graph and is used by the cursor.

Thereafter, the method 600 includes navigating through, or in, the graph using the cursor 620. Similar to action 530 in FIG. 5, the nodes are navigated or traversed using the cursor by iterating through the nodes of the cursor or spider.

Navigating iterates through the valid bindings for variables associated with a cursor. Valid bindings satisfy the variable restrictions. For example, where a variable has a has_type link associated with it, the variable will only bind to nodes or links of that type. Valid bindings also do not violate a condition of the cursor constraint graph and do not violate a restriction on any other variables in the cursor object. A client can change a variable's type constraint at any time. A variable with no type constraint is able to bind to any node or link.

Navigation includes accessing the first, last, next, and previous instance of a node or link with respect to a specified sort order. More specifically, accessing the first instance includes binding a variable to the first instance of the nodes and links, accessing the last instance includes binding a variable to the last instance of the nodes and links, accessing the next instance includes binding a variable to the next instance of the nodes and links, and accessing the previous instance includes binding a variable to the previous instance of the nodes and links. Where no sort order is specified, the order in which the nodes are returned is unspecified.

The method 600 optionally includes adding or attaching a linked node to, and deleting or detaching a linked node from, the graph. A node is detached by detaching all links connecting the node to the graph. Moreover, method 600 optionally includes retrieving information from the graph. More specifically, retrieving information includes retrieving the handle to the node that a specified variable is bound and retrieving the value of the node that a specified variable is bound. The method also includes setting the value of the node that a specified variable is bound.

Furthermore, the method 600 optionally includes beginning an atomic transaction, ending an atomic transaction, committing a current atomic transaction, and aborting a current atomic transaction.

Method 600 optionally includes cloning a cursor, entering snapshot mode in which the client using the graph will not change while the cursor is open and refreshing the snapshot mode in which a cursor is refreshed with live data from the graph, locking nodes or patterns to prevent concurrent access by another cursor, which is particularly useful during critical operations.

Lastly method 600 optionally includes specifying authorization levels and access permissions at various levels of granularity in order to identify users and levels of permission for access in which the identity of users and authorization level of a user or a process is transparently verified before access is allowed.

Thereafter, the method 600 ends.

Figure 6A:
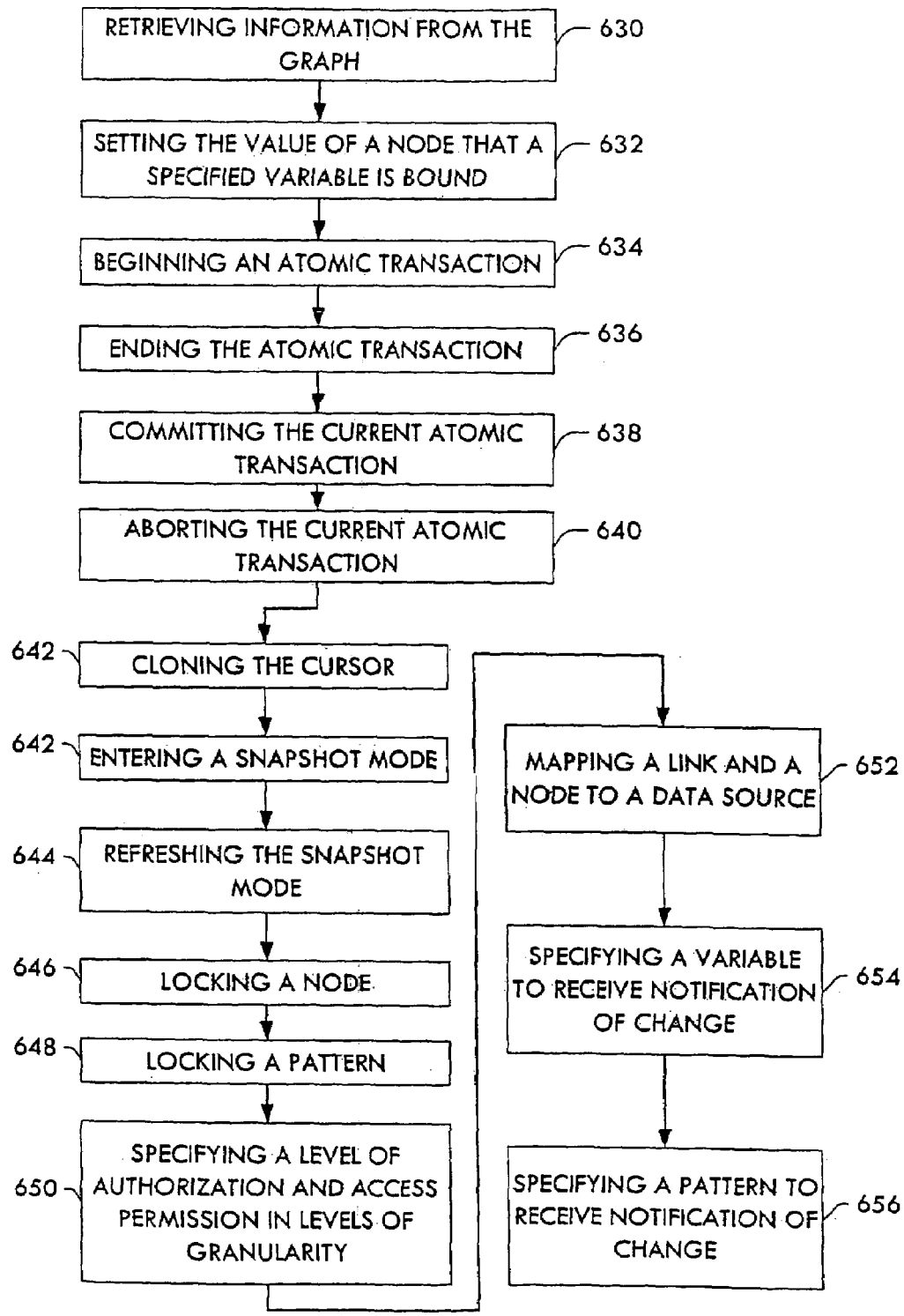
FIG. 6A is a flowchart of a method according to an exemplary embodiment of the invention.

Referring next to FIG. 6A a flowchart of a method to be performed by a computer, such as computer 20 in FIG. 1 according to an exemplary embodiment of the invention, is shown. Much of the method shown in FIG. 6A is discussed above as options or alternatives for method 600 of FIG. 6.

At 630, the method retrieves information from the graph.

At 632, it sets the value of a node that a specified variable is bound.

At 634, it begins an atomic transaction.

At 636, it ends the atomic transaction.

At 638, it commits the current atomic transaction.

At 640, the method aborts the current atomic transaction.

At 642, it clones the cursor.

At 644, it enters a snapshot mode.

At 646, it refreshes the snapshot mode.

At 648, the method locks a node.

At 650, it locks a pattern.

At 652, it specifies a level of authorization and access permission in levels of granularity.

At 654, it maps a link and a node to a data source.

At 656, it specifies a variable to receive notification of change. and

At 658, it specifies a pattern to receive notification of change.

Thereafter, the method of FIG. 6A ends.

Figure 7:
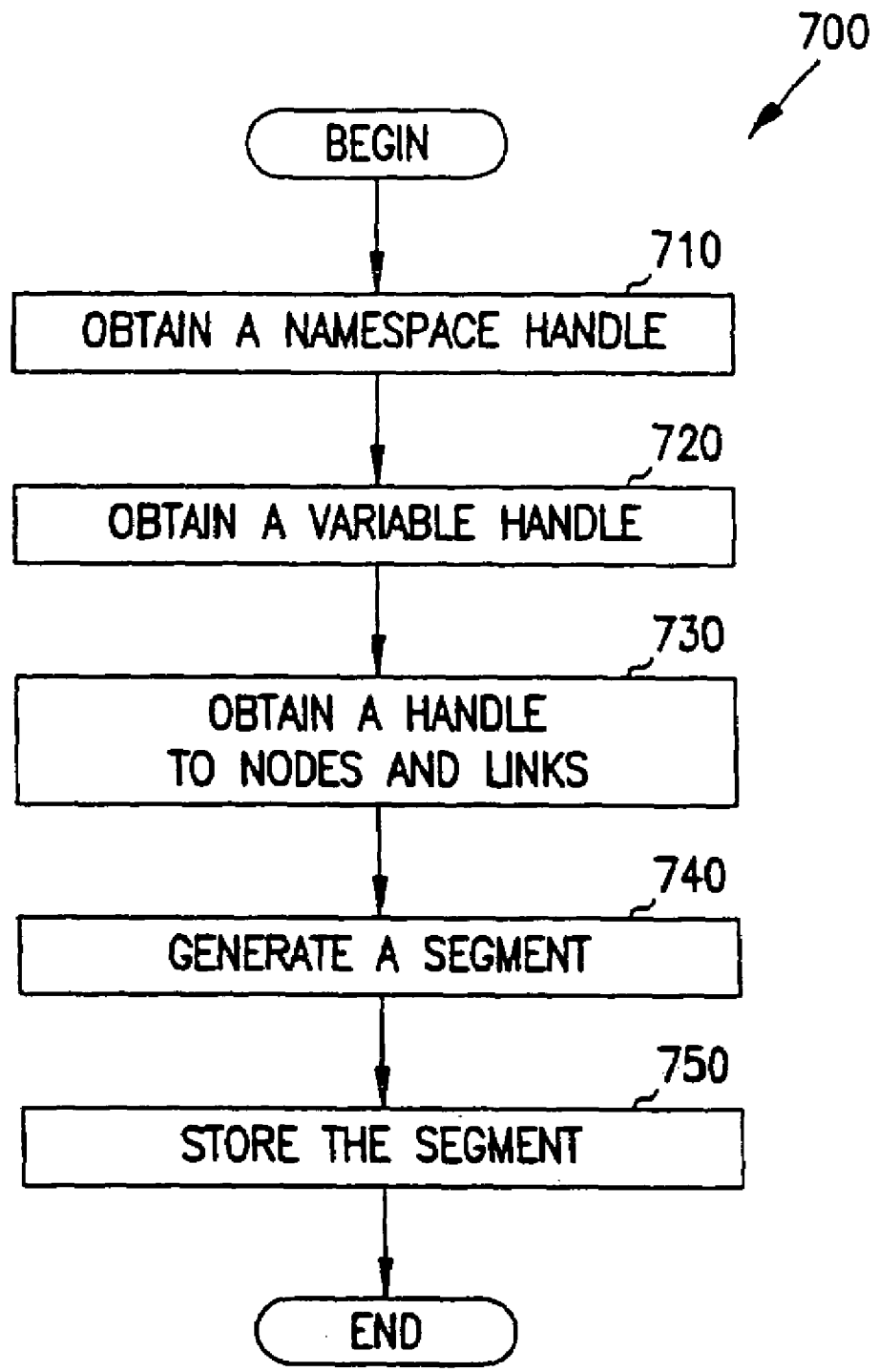
FIG. 7 is a flowchart of a method of generating a constraint graph according to an exemplary embodiment of the invention.

Referring next to FIG. 7, a flowchart of a method 700 to be performed by a computer, such as computer 20 in FIG. 1, according to an exemplary embodiment of the invention, is shown. Method 700 further discloses generating a constraint graph disclosed in conjunction with FIG. 6.

The method 700 starts with obtaining a handle to a required namespace node 710, yielding a namespace handle. In one embodiment, a namespace node is obtained from function GetNodeByName( ) described below. Handles to more than one namespace are obtained as needed. A namespace is a unique prefix that is used to designate the schema that is currently being referenced. The use of namespaces makes it possible to avoid name collisions when two elements in different schemas have the same name. As long as the namespace is specified, there is no confusion as to which element is being referenced. Namespaces are locally unique (unique only on a particular machine) or globally unique. The root namespace is the namespace of namespaces.

Namespaces are specified by Uniform Resource Identifiers (URIs). A globally-unique URI has the same format as a Uniform Resource Locator (URL). This ensures that these namespaces will be unique on any platform onto which they're imported. This is necessary because the present invention is designed to be able to take advantage of the extensive resources available on the Internet.

A URI is identified within a particular Extensible Markup Language (XML) file by a prefix that is prepended to the names of the schema elements belonging to that namespace.

For example, a namespace is "uspto.gov/SCORE/M16/core." The prefix by which this namespace is commonly identified is "core." The prefix is local to the XML file in which it is declared. The prefix must be declared in every file in which the namespace is used.

Figure 8:
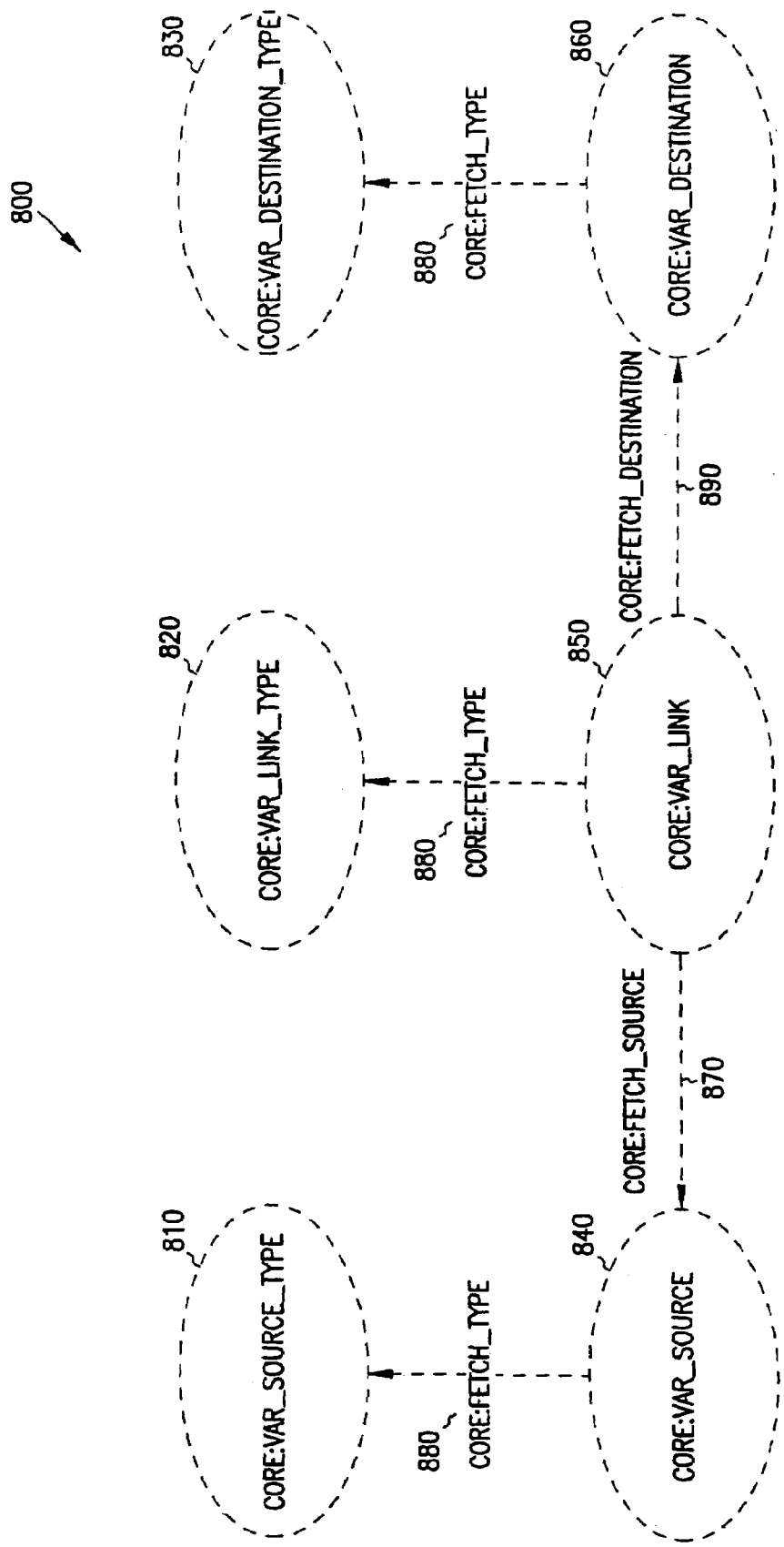
FIG. 8 is a constraint graph of the default pattern data structure according to an exemplary embodiment of the invention.

Thereafter, a handle to a variable is obtained 720 using the namespace handle(s) obtained in action 710, and a pattern variable, such as the default pattern described in conjunction with FIG. 8. The default pattern is used to create constraint graphs and other patterns. Handles to more than one variable are obtained as needed. Subsequently, the identity of each of a plurality of nodes and links associated with the namespace handle is determined 730. The identity of each of the plurality of nodes and links and the namespace handle is used to obtain a handle to each of the plurality of nodes and links 740. The method 700 also includes creating a default cursor using the default pattern described in conjunction with FIG. 8., in which the variable obtained in action 720 is bound to one of the plurality of nodes and links. The default spider pattern or default cursor is used to create new links and nodes. In the simple case of creating a new link between existing nodes, the var_source and var_destination variables in the default cursor are bound to the existing source and target nodes in the graph and then a new link is created bound to the variable var_link. This new link will be connected between the existing nodes according to the instructions in the default cursor as described below in conjunction with FIG. 8. Thereafter, the method 700 includes; generating a segment 750 for each of the nodes or links received in action 740, which includes creating a cursor for each of the node of links and optionally binding a variable to an existing node link or variable. Finally, the method stores the segments 760, and ends.

Referring next to FIG. 8, a diagram of a default pattern data structure 800, according to an exemplary embodiment of the invention, is shown.

Data structure 800 illustrates an embodiment of the spider 400 in FIG. 4, in which the names in the namespace in data structure 800 in FIG. 8 exemplify the embodiment in which the "fetch_type" name in FIG. 8 is semantically equivalent to the "match_type" name in FIG. 4. The default pattern 800 consists of six predefined variables called var_source_type 810, var_link_type 820, and var_destination_type 830, var_source 840, var_link 850, var_destination 860, and three types of implicit relations between them, named fetch_source 870, fetch_type 880, and fetch_destination 890. The var_source 840, var_link 850, and var_destination 860 variables define the fundamental relationships between a source, a link, and a destination in the spider. These variables are used to create instances of entities, relations, and variables, and to create patterns that are matched against other patterns in the spider in order to retrieve or store specific information.

Relations that can exist between two variables are requires (not shown), forbids (not shown), fetch_source 870, fetch_destination 890, and fetch_type 880. The default pattern includes a fetch_source link 870 from the var_link variable 850 to the var_source variable 840 and a fetch_destination link 890 from the var_link variable 850 to the var_destination variable 860. These links specify which entity is the source of a relation and which entity is its target. The fetch_source and fetch_destination relations associate a variable that binds to a relation with the variable that binds to the relation's source and the variable that binds to its destination. The fetch_type relation creates an association between a variable and the type of the node or link to which the variable is bound. Variables var_source 840 and var_destination 860 are able to bind to an entity, a relation, or a variable. The var_link variable 850 can only be bound to a relation. When an instance of a relation is created, the fetch_source link 870 and the fetch_destination link 890 are implicitly supplied by the pattern. When a variable that is intended to bind to a relation is created, the instances of the fetch_source link 870 and fetch_destination link 890 are created explicitly because a variable, even when bound to a link is a node. However, nodes do not have a fetch_source link or a fetch_destination link. To create a variable, for example variable A that binds to instances of a relation, a fetch_source relation and a fetch_destination relation are previously created explicitly, using variable A as the source for both of them. When a second variable, for example variable B, is used as the destination of the fetch_source relation, and a third variable, variable C, is used as the destination of the fetch_destination relation, then variable A will bind to relation instances whose source is bound to variable B and whose destination is bound to variable C.

The requires and forbids relations are used when creating patterns and constraint graphs. These relations generally have a variable that binds to an entity as their source and a variable that binds to a relation as their destination.

The requires relation specifies that the entity instance to which its source variable is bound must be associated with the relation instance to which its destination variable is bound. It is not necessary to specify a requires constraint from a relation to its source or destination. An instance of a relation could not exist without its source and destination, so a requires constraint would be redundant.

The forbids relation is the opposite of the requires relation. It specifies that the entity instance to which its source variable is bound must not be associated with a relation to which its destination variable could be bound.

When a new entity, relation, or variable is created, the variable that was used to create the new element is automatically bound to the new element.

Figure 9:
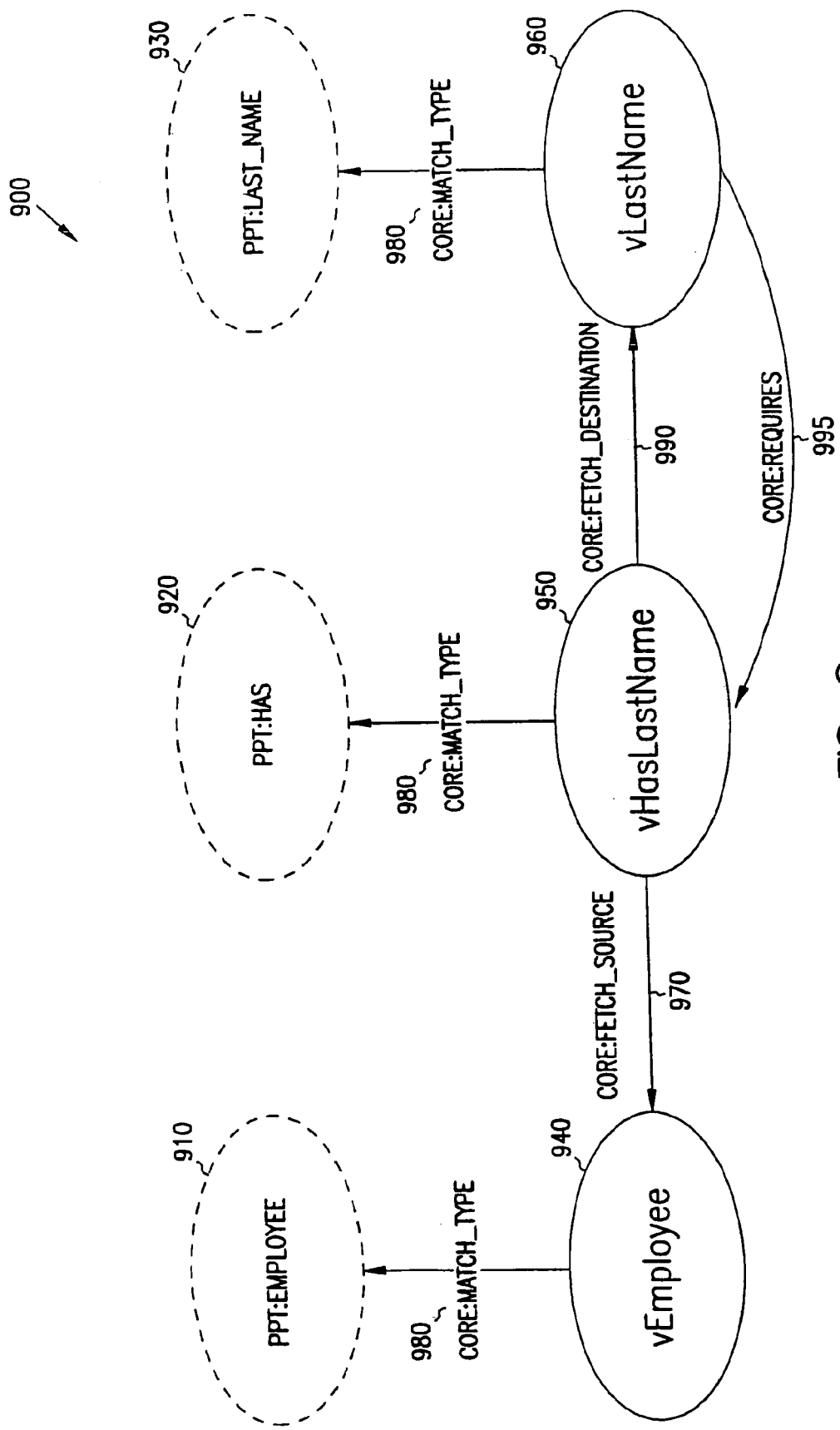
FIG. 9 is a constraint graph of an employee pattern data structure according to an exemplary embodiment of the invention.

Referring next to FIG. 9, a diagram of an employee pattern data structure 900, according to an exemplary embodiment of the invention, is shown. The employee pattern data structure 900 shows use of the default pattern data structure 800 in FIG. 8 to enable retrieval of an employee's last name.

The default pattern 900 consists of six predefined variables called ppt:employee 910, ppt:has 920, and ppt:last_name 930, vEmployee 940, vHasLastName 950, vLastName 960, and three types of implicit relations between them, named fetch_source 970, fetch_typematch_type 980, fetch_destination 990 and a requires constraint 995. Variables vEmployee 940, vHasLastName 950, vLastName 960 define the fundamental relationships between a source, a link, and a destination in the spider. These variables are used to create instances of entities, relations, and variables, and to create patterns that are matched against other patterns in the spider in order to retrieve or store specific information.

When the vEmployee variable 940 is bound to an instance of the type employee, the vLastName 960 variable will automatically bind to the last name associated with that specific instance of employee. As a result, the vEmployee variable 940 will only bind to instances of the type ppt:employee 910 or its subtypes, the vLastName variable 960 will only bind to instances of the type ppt:last_name 930, or its subtypes, and the vHasLastName variable 950 will only bind to instances of the type ppt:has 920, or any subtypes it has.

The requires constraint 995 specifies that the instance of last_name to which the vLastName 960 binds must be the destination of the specific has instance to which the vHasLastName 950 variable is bound. If this pattern 900 did not include the requires link 995, the vLastName 960 variable could bind to any instance of last_name, regardless of the particular instances to which the vEmployee variable 940 and the vHasLastName variable 950 were bound. The requires relation 995 between vLastName 960 and vHasLastName 950 also specifies that, even if the other two variables aren't bound to anything, the vLastName 960 variable can only bind to those instances of the type last_name that are, in fact, the destination of a has relation to which vHasLastName 950 could legally bind.

To traverse the pattern in the other direction by binding vLastName 960 and retrieving the specific instance of employee associated with the last_name instance to which vLastName 960 was bound, a requires link 995 would be added from vEmployee 940 to vHasLastName 950 as well.

Figure 10:
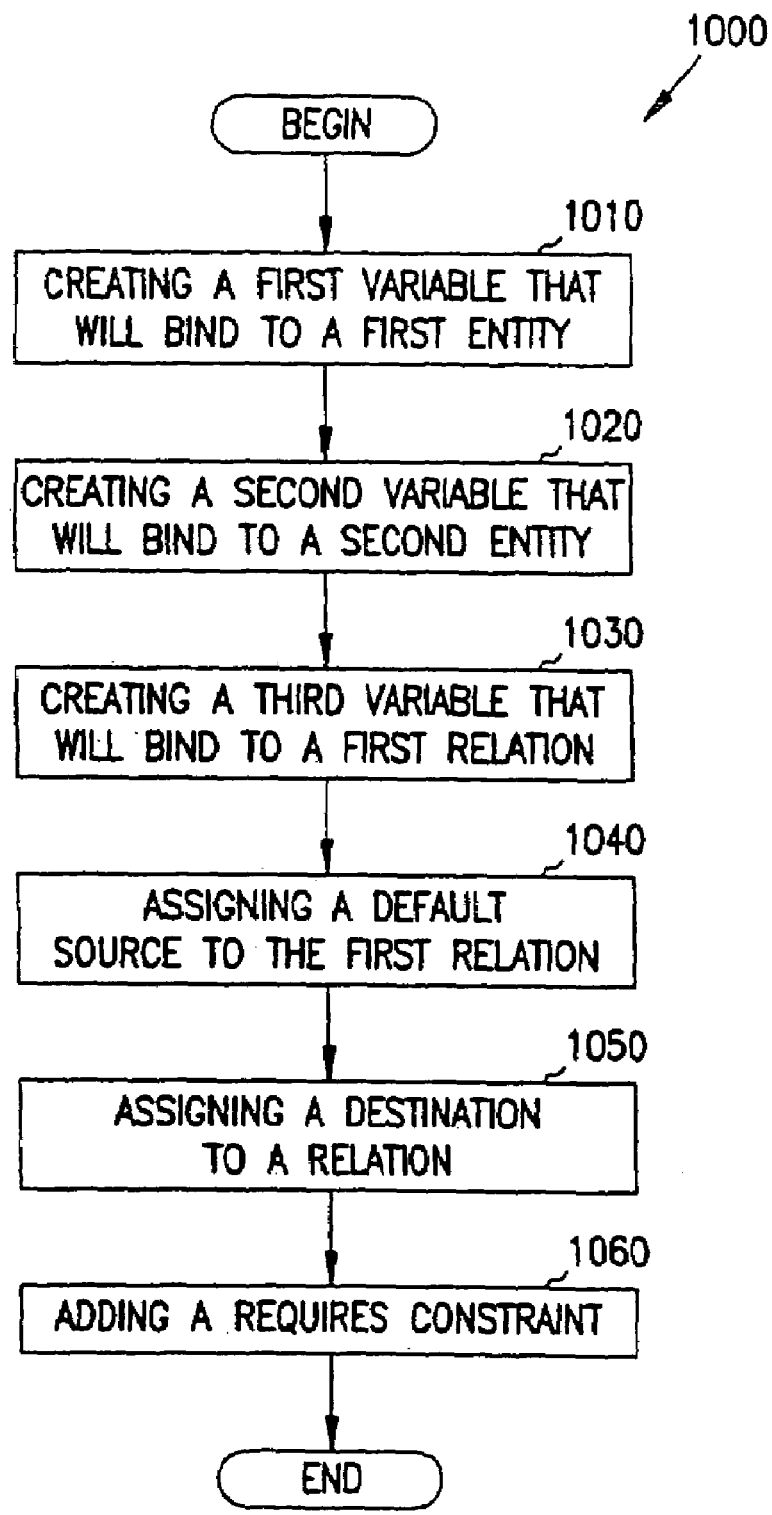
FIG. 10 is a flowchart of a method of generating the employee pattern data structure in FIG. 9 according to an exemplary embodiment of the invention.

Referring next to FIG. 10, a flowchart of a method 1000 to be performed by a computer, such as computer 20 in FIG. 2, according to an exemplary embodiment of the invention, is shown. Method 1000 discloses generating the employee pattern data structure 900 in FIG. 9 from the default pattern data structure 800 in FIG. 8.

The method 1000 starts with creating a first variable that will bind to a first entity 1010. More specifically, a variable that will bind to instances of the ppt:employee entity is created. This action 1010 includes creating an instance of core:variable from the core:var_source default variable, then binding the core:var_destination default variable to the type ppt:employee, creating an instance of the core:match_type relation from the core:var_link default variable, storing this segment, obtaining a node handle (vEmployee) to the new variable ppt:employee, and unbinding variables core:var_source, core:var_destination and core:var_link.

Method 1000 also includes creating a second variable that will bind to a second entity 1020. More specifically, creating a variable that will bind to instances of the ppt:last_name entity. Action 1020 includes creating a new instance of core:variable from the core:var_source default variable, then binding the core:var_destination default variable to the type ppt:last_name, creating a new instance of the core:match_type relation from the core:var_link default variable, storing this segment of the employee pattern data structure 900 in FIG. 9, obtain a node handle (vLastName) to the new variable ppt:last_name, and unbinding variables core:var_source, core:var_destination and core:var_link.

Furthermore, method 1000 includes creating a third variable that will bind to a first relation 1030. More specifically, creating a variable that will bind to instances of the ppt:has relation. Action 1030 includes creating a new instance of core:variable from the core:var_source default variable, binding the core:var_destination default variable to the type ppt:has, creating a new instance of the core:match_type relation from the core:var_link default variable, storing this segment of the employee pattern data structure 900 in FIG. 9, obtaining a node handle (vHasLastName) to the new variable ppt:has, and unbinding variables core:var_destination and core:var_link. At this point, the core:var_source variable is bound to the new instance of core:variable identified by the vHasLastName handle.

Subsequently, method 1000 includes assigning a default source to the first relation 1040. More specifically, creating a relation that specifies the source of the relation identified by the vHasLastName handle as the entity identified by the vEmployee handle. Action 1040 includes binding the var_destination default variable to the new instance of core:variable identified by the vEmployee handle, creating an instance of the fetch_source relation from the core:var_link default variable, storing this segment of the employee pattern data structure 900 in FIG. 9, unbinding variables core:var_destination and core:var_link. At this point, the core:var_source variable is bound to the new instance of core:variable identified by the "vHasLastName" handle. Thereafter, method 1000 includes assigning a destination to a relation 1050. More specifically, creating a relation that specifies the destination of the relation identified by the vHasLastName handle as the entity identified by the "vLastName" handle. Action 1050 includes binding the default variable var_destination to the new instance of core:variable identified by the "vLastName" handle, creating an instance of the fetch_destination relation from the default variable core:var_link, storing this segment of the employee pattern data structure 900 in FIG. 9, and unbinding variables core:var_source, core:var_destination and core:var_link.

The final step in method 1000 is adding a requires constraint 1060. More specifically, establishing a constraint that requires variable vLastName to be bound to the specific instance of ppt:last_name that is associated with the specific instance of the ppt:has relation to which the variable vHasLastName is bound. Action 1060 includes binding the core:var_source variable to a new variable vLastName, binding variable core:var_destination to a new variable vHasLastName, creating an instance of the core:requires relation from the default variable core:var_link, storing this segment of the employee pattern data structure 900 in FIG. 9, unbinding variables core:var_source, core:var_destination, and core:var_link.

Thereafter, method 1000 ends.

Figure 11:
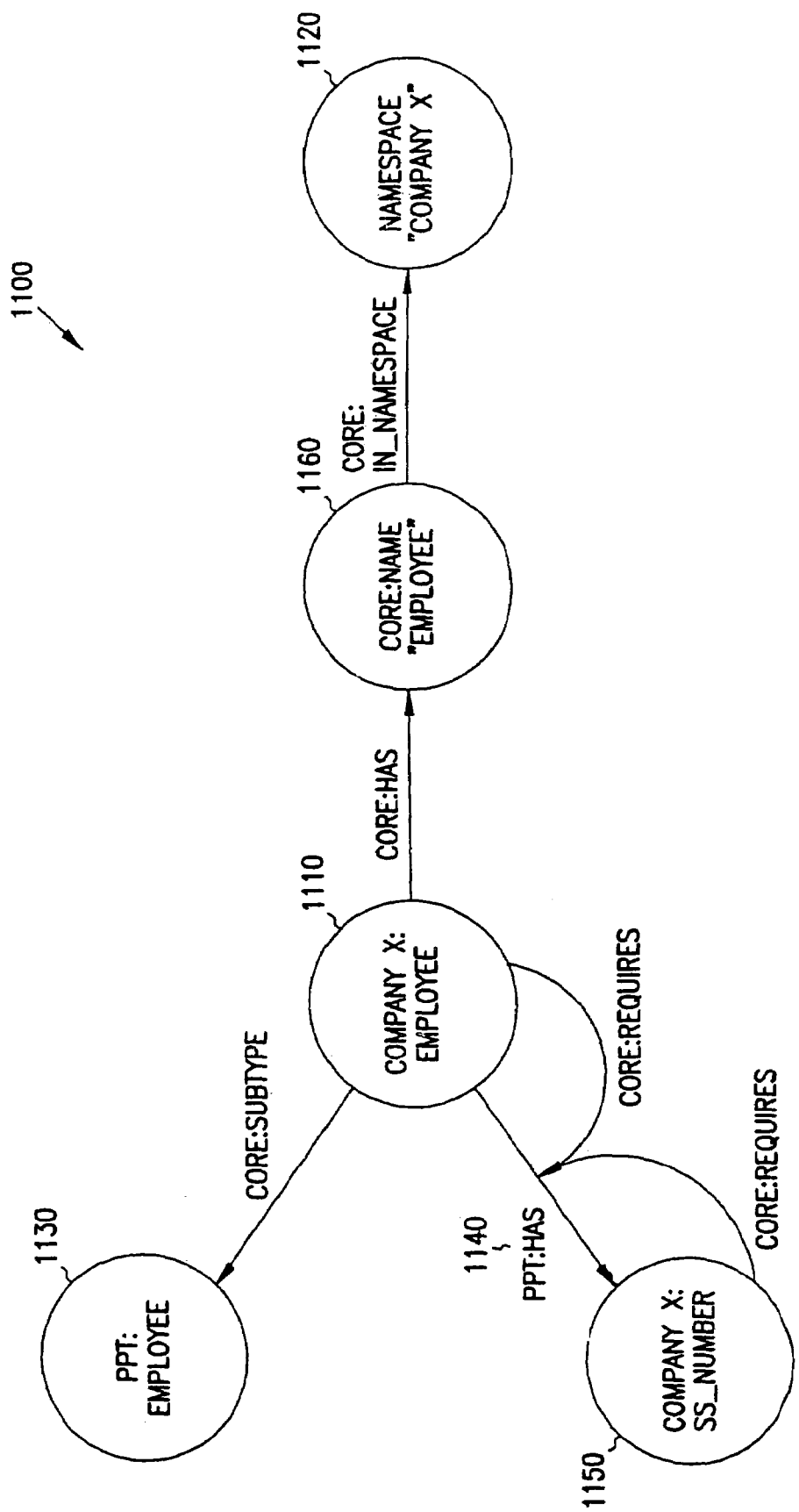
FIG. 11 is a constraint graph of a company pattern data structure according to an exemplary embodiment of the invention.

Referring next to FIG. 11, a diagram of a company pattern data structure 1100, according to an exemplary embodiment of the invention, is shown.

The company pattern 1100 consists of an employee node 1110 created in the "company X" namespace 1120. The employee node 1110 is a subtype of ppt:employee 1130 and has an added constraint 1140 that every employee must have a social security number (SSN#) 1150. The companyX namespace 1120 and the companyX:ss_number 1150 type exist previously. 1120 represents the namespace "companyX". 1160 represents one name within that namespace, "employee". There is at least one other name within that namespace, "ss_number", required to name 1150. Thus, 1110 "has" the name identified by 1160: "companyX:employee".)

Figure 12:
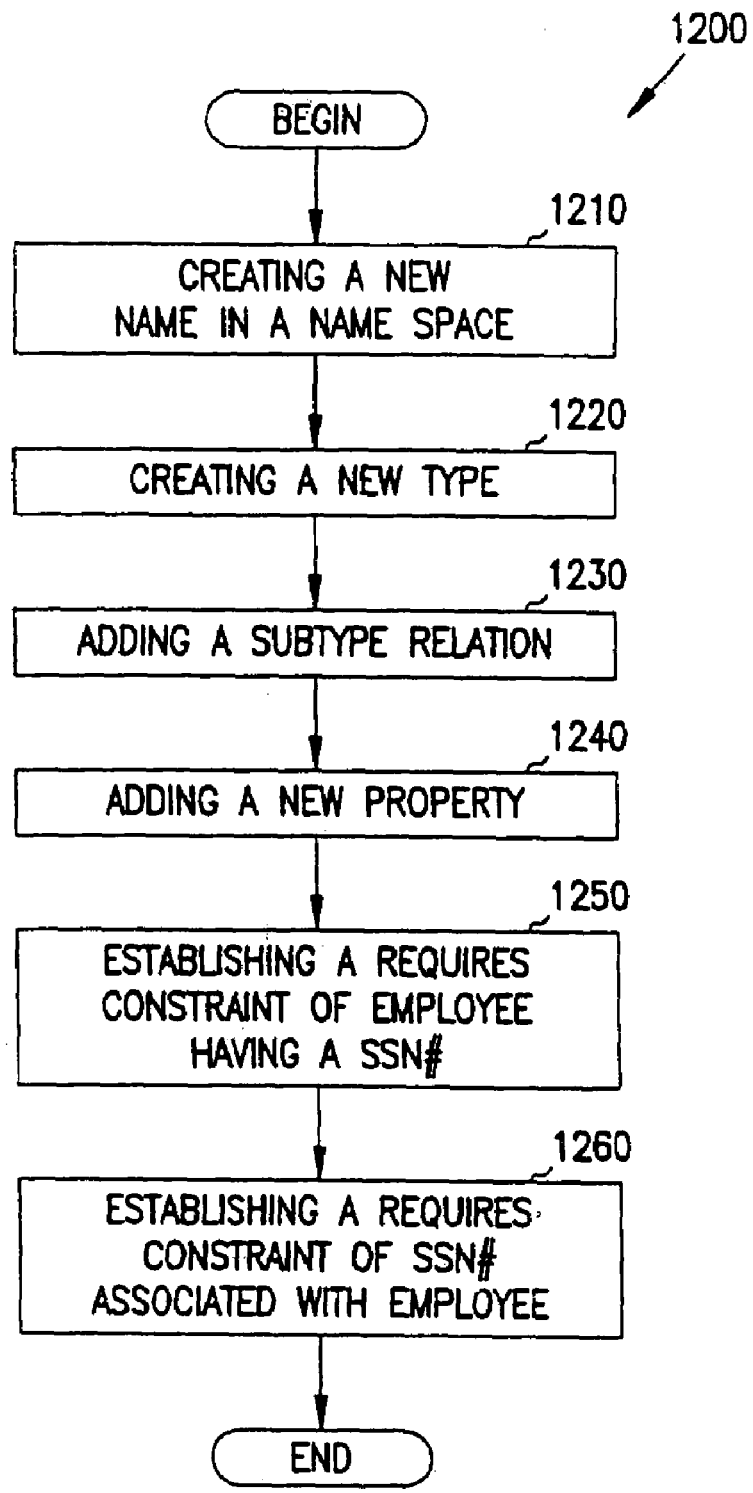
FIG. 12 is a flowchart of a method of generating the company pattern data structure in FIG. 11 according to an exemplary embodiment of the invention.

Referring next to FIG. 12, a flowchart of a method 1200 to be performed by a computer, such as computer 20 in FIG. 2, according to an exemplary embodiment of the invention, is shown. Method 1200 discloses generating the company pattern data structure 1100 in FIG. 11 from the default pattern data structure 800 in FIG. 8.

The method 1200 starts with creating a new name in a namespace 1210. More specifically, creating the name "employee" in the namespace for Company X. Action 1210 includes creating a new instance of the node core:name that is bound to variable core:var_source, and set the value to "employee", binding variable core:var_destination to core:namespace node that has the value "companyX", creating a new instance of relation core:in_namespace bound to variable core:var_link, storing this segment of the company pattern, obtaining a handle to the new instance of node core:name and unbinding variables core:var_source, core:var_destination, and core:var_link.

Method 1200 also includes creating a new type 1220. More specifically, creating a new type and associating the new type with the new instance of node core:name, all in the companyX namespace, that has the value "employee." Action 1220 includes creating a new instance of node core:type that is bound to variable core:var_source, binding variable core:var_destination to new instance of the node core:name, creating a new instance of relation core:has bound to variable core:var_link, storing this segment of the company pattern, obtaining a handle to the new instance of node core:type and unbinding variables core:var_destination and core:var_link, leaving core:var_source bound to the new instance of node core:type.

Furthermore, method 1200 also includes adding a subtype relation 1230. More specifically, establishing a subtype relation between the new node hnEmployee and the node ppt: employee. Action 1230 includes binding variable core:var_destination to existing node core:employee, creating a new instance of relation core:subtype bound to variable core: var_link, storing this segment of the company pattern, and unbinding variables core:var_destination and core:var_link, leaving core:var_source bound to the new instance of node core:type.

Subsequently, method 1200 includes adding a new property 1240. More specifically, establishing a has relation between the new node core:type and the previously existing node companyX:ss_number which represents a SSN#. Action 1240 includes binding variable core:var_destination to existing node companyX:ss_number, creating a new instance of relation ppt:has bound to variable core:var_link, storing this segment of the company pattern, obtaining a handle to the new instance of relation ppt:has and unbinding variables core:var_destination and core:var_link, leaving core:var_source bound to the new instance of node core:type.

Thereafter method 1200 includes establishing a requires constraint of employee having a SSN# 1050. More specifically, establishing a constraint that requires an employee to have SSN#. Action 1250 includes binding variable core: var_destination to new node identified by companyX:ss_number, creating a new instance of relation core:requires bound to variable core:var_link, storing this segment of the company pattern and unbinding variables core:var_destination and core:var_link, leaving core:var_source bound to the new instance of node core:type.

Lastly, method 1200 includes establishing a requires constraint of a SSN# associated with employee 1260. More specifically, establishing a constraint that requires a SSN# to be associated with an employee. Action 1260 includes binding variable core:var_source to existing node companyX:ss_number, binding variable core:var_destination to existing node employee 1260, creating a new instance of relation core:requires bound to variable core:var_link, storing this segment of the company pattern and unbinding variables core:var_source, core:var_destination, and core:var_link.

Figure 13:
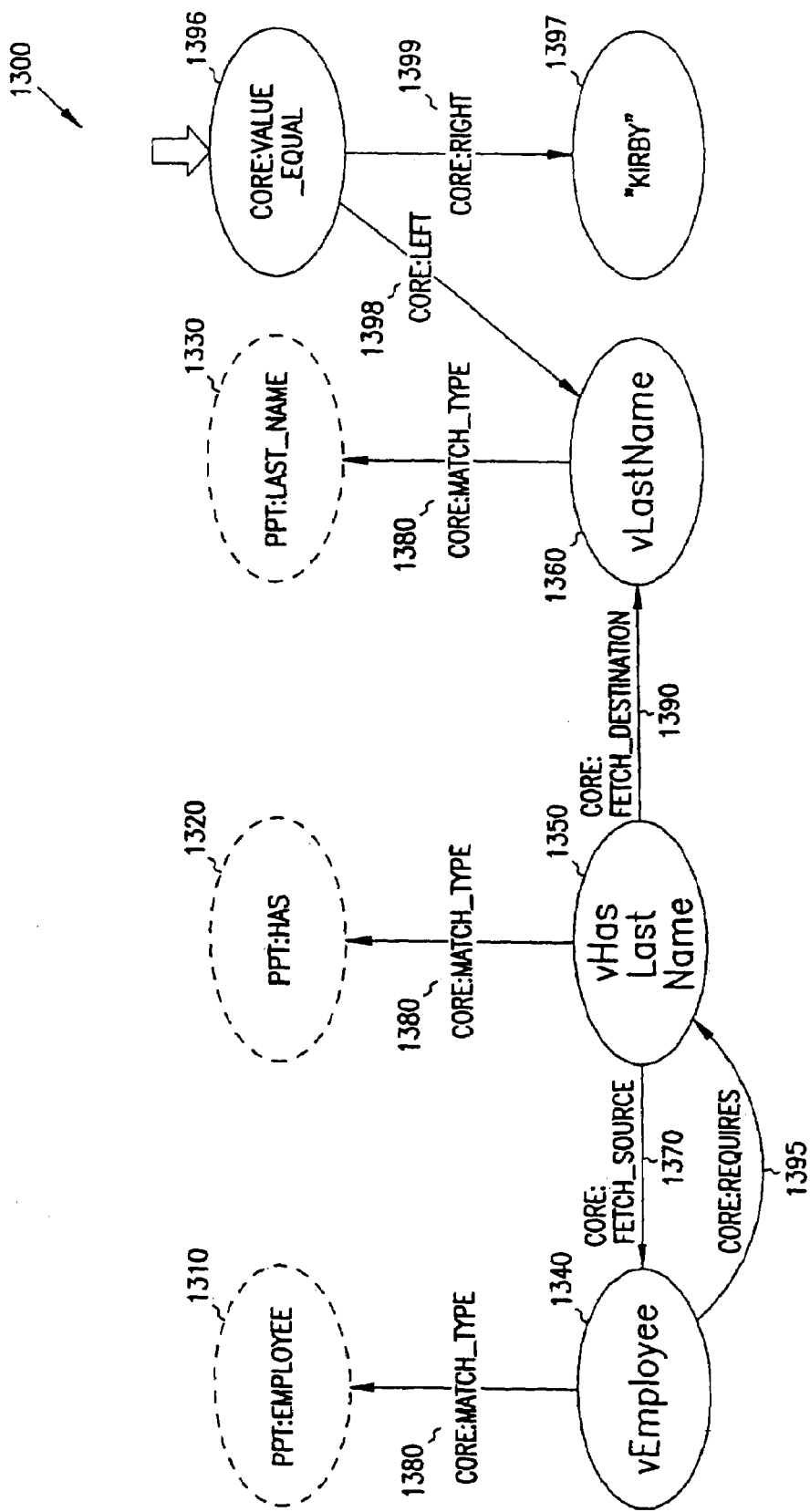
FIG. 13 is a constraint graph of a second employee pattern data structure according to an exemplary embodiment of the invention.

Referring next to FIG. 13, a diagram of a second employee pattern data structure 1300, according to an exemplary embodiment of the invention, is shown. The employee pattern data structure 1300 shows use of the default pattern data structure 800 in FIG. 8 to enable retrieval of an employee's last name. The employee pattern 1300 consists of six predefined variables called ppt:employee 1310, ppt:has 1320, and ppt:last_name 1330, vEmployee 1340, vHasLastName 1350, vLastName 1360, and three types of implicit relations between them, named fetch_source 1370, fetch_type 1380, fetch_destination 1390. The characteristics and relations of the above items in FIG. 13 correspond to those in FIG. 9. The pattern also includes a requires constraint 1395. Variables vEmployee 1340, vHasLastName 1350, vLastName 1360 define the fundamental relationships between a source, a link, and a destination in the spider. These variables are used to create instances of entities, relations, and variables, and to create patterns that are matched against other patterns in the spider in order to retrieve or store specific information.

The differences between FIG. 9 and FIG. 13 are disclosed as follows. In regards to the requirement constraint 1395, rather that having a constraint that requires the vLastName variable 1360 to be bound to the destination of the relation to which the vHasLastName variable 1350 is bound as in FIG. 9, the employee pattern in FIG. 13 has a constraint 1395 that requires the vEmployee variable 1340 to be bound to the source of the relation to which the vHasLastName variable is bound 1350. The reason for this difference in constraints is that this constraint graph 1300 will be traversed from a value_equal node 1396 to its operands Kirby 1397 and vLastName 1360, and then backward from the vLastName variable 1360 to the vEmployee variable 1340 by way of the vHasLastName variable 1350. Because the vLastName variable 1360 is a left operand 1398 of the core:value_equal node 1396, and the value Kirby 1397 is the right operand 1399, only last names with a value equal to Kirby 1397 will be traversed by a cursor object with this constraint graph 1300. When the vLastName variable 1360 is bound to an instance of ppt:last_name 1330, the vHasLastName variable 1350 must bind to the instance of ppt:has 1320 whose destination is that instance of ppt:last_name 1330 because it is being traversed from that direction. However, without a core:requires constraint 1395, the vEmployee variable 1340 could bind to any instance of ppt:employee 1310. The core:requires constraint 1395 specifies that the vEmployee variable 1340 can only bind to the instance of ppt:employee 1310 that is the source of the specific ppt:has 1320 instance to which the vHasLastName variable 1350 is currently bound.

Figure 14:
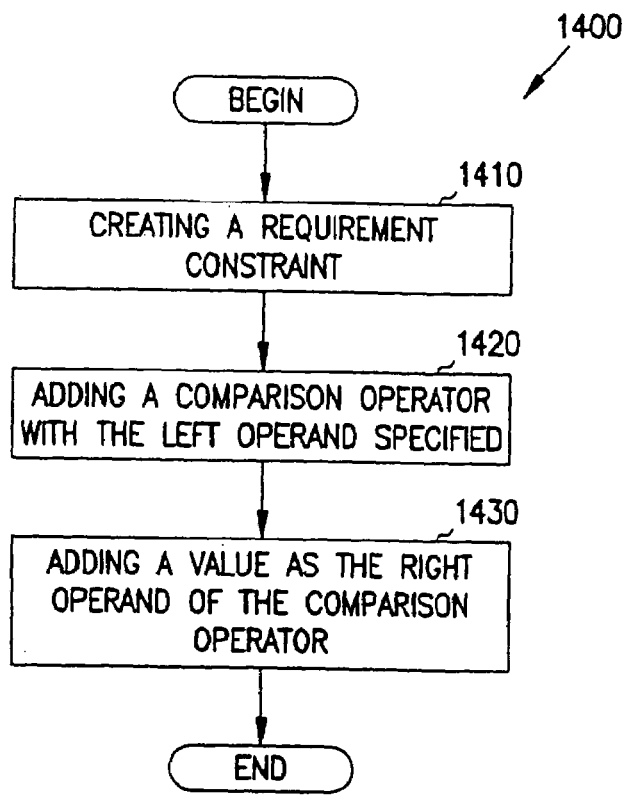
FIG. 14 is a flowchart of a method of generating the constraint graph pattern data structure in FIG. 12 according to an exemplary embodiment of the invention.

Referring next to FIG. 14, a flowchart of a method 1400 to be performed by a computer, such as computer 20 in FIG. 2, according to an exemplary embodiment of the invention, is shown. Method 1400 discloses generating the constraint graph pattern data structure 1300 in FIG. 13 from the default pattern data structure 900 in FIG. 9.

Provided that from the variables form FIG. 13 that will bind to instances of ppt:employee 1310, ppt:has 1320, and ppt: last_name 1330 have already been created, and the fetch_source 1370 and fetch_destination relations 1390 for the vHasLastName variable 1350 have been established, this method 1400 begins with creation of the requirement constraint 1410. More specifically, action 1410 includes binding variable core:var_source to new variable "employee", binding variable core:var_destination to new variable vHasLastName, creating a new instance of relation core:requires bound to variable core:var_link, storing this segment of the employee pattern and unbinding variables core:var_source, core:var_destination, and core:var_link.

Subsequently, method 1400 includes adding a comparison operator with the left operand specified 1420. More specifically, adding a comparison operator and assigning the variable vLastName as it left operand. Action 1420 includes creating a new instance of node core:value_equal from default variable core:var_source, binding variable core: var_destination to new variable vLastName, creating a new instance of relation core:left from default variable core: var_link, storing this segment of the employee pattern, obtaining a handle to the new instance of core:value_equal for use as the root of the constraint graph 1400, and unbinding variables core:var_destination and core:var_link, leaving core:var_source bound to the new instance of node core:value_equal.

Lastly, method 1400 includes adding a value as the right operand of the comparison operator 1430. More specifically, creating a new text node and assigning it as the right operand of the comparison operator. Action 1420 includes creating an instance of node core:text from default variable core:var_destination, creating a new instance of relation core:right from default variable core:var_link, storing this segment of the employee pattern, obtaining a handle to the new instance of core:value_equal for use as the root of the constraint graph 1400, and unbinding variables core:var_destination, core:var_link, and core:var_source.

Object-Oriented Implementation

In this section of the detailed description, a particular implementation of the invention is described that is object-oriented.

Figure 15:
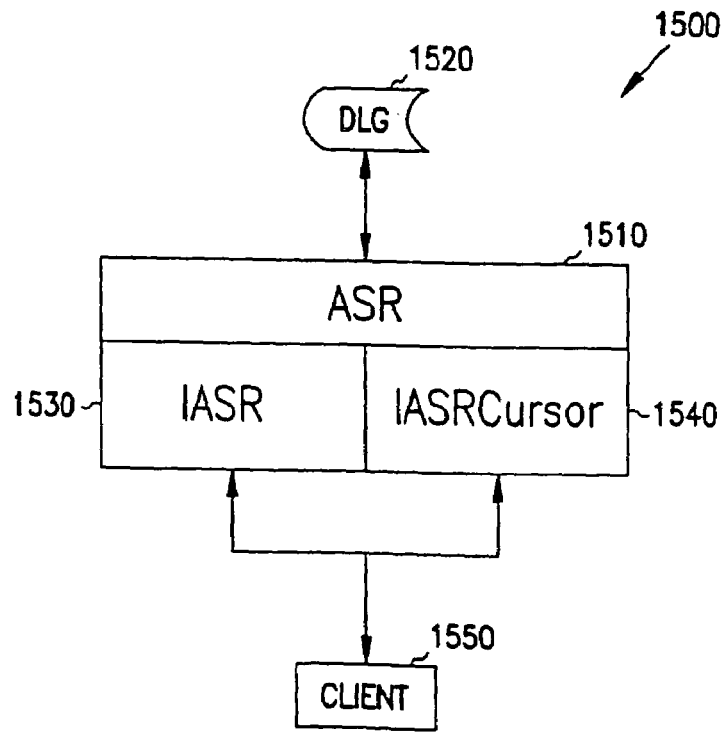
FIG. 15 is a block diagram of an apparatus of the present invention according to an exemplary embodiment of the invention.

Referring to FIG. 15, system 1500 includes an annotated schema runtime (ASR) engine 1510 that is implemented as an object. There is only one active ASR object 1510 in an instance of the operating system. The ASR object 1510 maintains metaschema, schema, and instance data as a single directed labeled graph (DLG) 1520 that is stored in a physical medium such as, system memory 22, hard disk drive 27, magnetic disk drive 28, and optical disk drive 30 in FIG. 2.

The spider has a low-level application program interface (API) that invokes the ASR 1510. The Spider API consists of two Component Object Model (COM) interfaces: an ASR interface (IASR) 1530 and the IASRCursor interface 1540. The IASR 1530 is implemented by, and is operably coupled to, the ASR object 1510. The IASRCursor interface 1540 is implemented by one or more ASR cursor objects and is operably coupled to the ASR object 1510. This is illustrated at 1545 of system 1505 of FIG. 15A. Multiple active instances of ASR cursor objects are enabled. An ASR cursor is a transient COM object that enables a client 1550 to navigate within the ASR. This is illustrated at 1545 of system 1505 of FIG. 15A. Name, namespace, prefix, type, variable, and operator are all objects.

The IASR 1530 and/or IASRCursor interface 1540 may be considered an apparatus having at least one variable bound to a node or link in the directed labeled graph operably coupled to the annotated schema runtime engine.

Figure 15A:
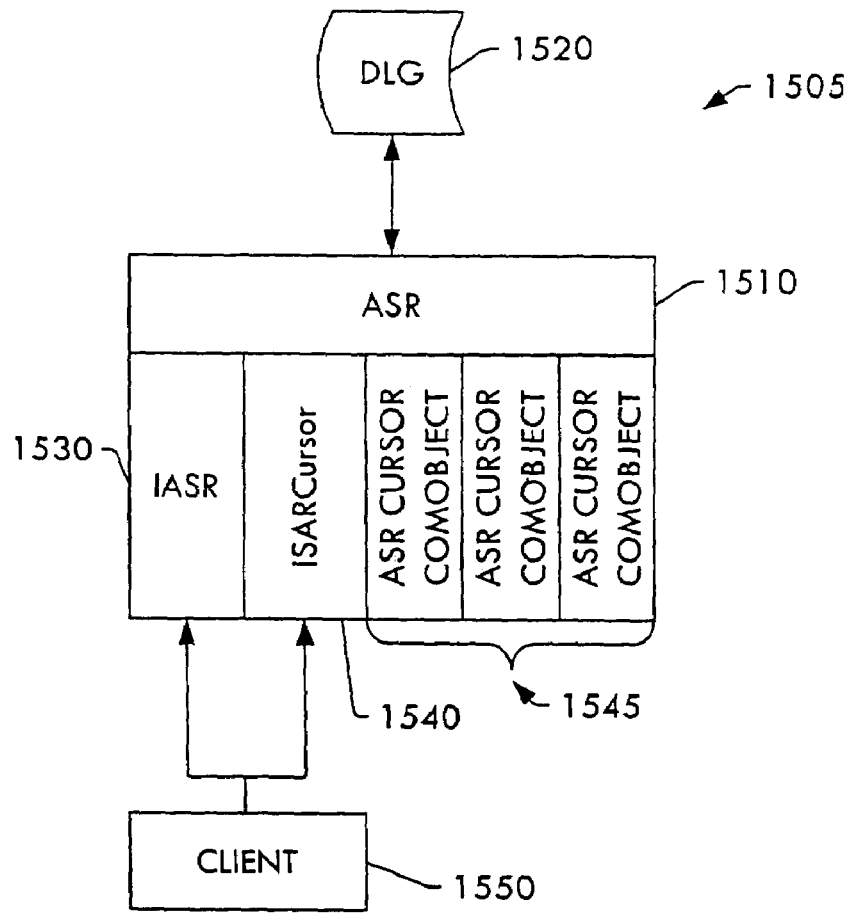
FIG. 15A is a block diagram of an apparatus of the present invention according to an exemplary embodiment of the invention.

Referring to FIG. 15A, system 1505 includes the same components as system 1500 of FIG. 15 except that it includes one or more ASR cursor COM objects 1545.

A client 1550 accesses the spider through an API to the IASR 1530 and the IASRCursor interface 1540. The client 1550 invokes the methods disclosed in FIGS. 5-7, 10, 12, and 14 and the related discussions herein.

The IASR interface 1539 provides methods that enable a client 1550 to retrieve elements by name from the ASR graph 1520 and to create ASR cursor objects. A client 1550 obtains a pointer to the IASR 1530 on the ASR object by invoking the COM CoCreateInstance function.

HRESULT GetNodeByName(HNODE hnNamespace, BSTR bstrName, HNODE *pnOut)

The getnodebyname method obtains a handle to a node, given the node's namespace and name. This method is used for bootstrapping and for looking up schema and instance data that is already known to the caller. To conserve memory, the ASR maintains a limited number of node handles and allows multiple clients to use the same handle to access a node or link in the graph. This means fewer handles have to be maintained, but it requires that a reference count be maintained on every handle to determine when all clients are finished using it. Every time a client uses the GetNodeByName( ) method to obtain a handle, the reference count on the handle is incremented. When the client no longer requires the handle, it must call ReleaseHandle( ) to decrement the handle's reference count. When the reference count reaches 0, the handle is recycled. If a client passes this handle to another object, it must invoke the AddRefHandle( ) method to increment the reference count on the handle before passing it.

| Parameter | Description |
| --- | --- |
| hnNamespace | The handle to the node representing the namespace to use when searching for this name. If NULL, the root namespace is assumed, which is the namespace encompassing all namespaces. |
| bstrName | The name of the node for which to search. |
| pnOut | A pointer to the handle to the node associated with the name varName in the namespace identified by hnNamespace. (Out parameter) |

The getnodebyname method can return the following values:

| Return value | Description |
| --- | --- |
| S_OK | Success. pnOut points to the handle to the requested node. |
| S_FALSE | The requested name was not found in the specified namespace. pnOut is set to NULL. |

HRESULT AddRefHandle(HNODE hn)

This method increments the reference count on a node handle that it has obtained by invoking the IASR::GetNodeByName( ) or the IASRCursor::GetHandle( ) method.

| Parameter | Description |
| --- | --- |
| hn | The handle to the node on which to increment the reference count. |

This method can return the following values:

| Return value | Description |
| --- | --- |
| S_OK | Success. The reference count was incremented. |

HRESULT ReleaseHandle(HNODE hn)

This method decrements the reference count on a node handle that it has obtained by invoking the IASR::GetNodeByName or the IASRCursor::GetHandle method. The handle is recycled if the reference count falls below one.

| Parameter | Description |
| --- | --- |
| hn | The handle to the node to release. |

This method can return the following values:

| Return value | Description |
| --- | --- |
| S_OK | Success. The reference count was decremented. |
| TBD | |

HRESULT CreateCursor(HNODE hnRestrictions, IASRCursor **ppCursOut)

The createcursor method takes a handle to a node that is the root of a constraint graph that specifies the subset of the ASR graph 1520 the cursor object can access. This method returns a pointer to the IASRCursor interface on a graph cursor (the spider) that enables traversal of all nodes and links in the ASR 1510 that satisfy the restrictions.

A client 1550 can create a default ASR cursor object by calling the IASR::CreateCursor method passing the nNull constant in the hnRestrictions parameter. The default ASR cursor object has no constraints.

| Parameter | Description |
| --- | --- |
| hnRestrictions | The handle to a node that is the root of a restriction graph. Each node in the graph represents a restriction on the values a node may have in order for a variable in this ASR cursor object to legally bind to it. If this parameter is NULL, the method will return the default ASR cursor object, which has no constraints. |
| ppCursOut | A pointer to the IASRCursor interface on the newly created ASR cursor object. (Out parameter) |

The createcursor method can return the following values:

| Return value | Description |
| --- | --- |
| S_OK | Success. ppCursorOutpoints-to the IASRCursor interface on the newly created ASR cursor object. |
| E_INVALIDARG | ppCursOut is a null pointer. |
| E_OUTOFMEMORY | There is insufficient memory to complete the operation. |

HRESULT NameNode(HNODE hn, HNODE hnNamespace, BSTR bstrName)

The namenode method assigns a name and namespace to a node.

| Parameter | Description |
| --- | --- |
| hn | The handle to the node which to assign the name. |
| hnNamespace | The handle to the node representing the namespace to use when searching for this name. If NULL, the root namespace is assumed, which is the namespace encompassing all namespaces |
| bstrName | The name to assign to the node hn in the hnNamespace namespace. |

The namenode method can return the following values:

| Return value | Description |
| --- | --- |
| S_OK | Success. The node identified by the handle hn is now associated with the name specified by bstrName in the hnNamespace namespace. |
| S_FALSE | The name specified by bstrName already exists in the hnNamespace namespace. |
| E_INVALIDARG | Either hn is not a valid node handle or bstrName is NULL. |

The IASRCursor interface 1540 provides low level methods for traversing and manipulating graph schema and instance data 1520 in the ASR 1510. This interface is implemented by the ASR cursor component. A client 1550 creates an ASR cursor object and obtain a pointer to its IASRCursor interface by invoking the IASR::CreateCursor method on the ASR object.

An ASR cursor object is commonly created with a constraint graph that defines the subset of the ASR graph 1520 over which the cursor object can traverse. An ASR cursor object that has no constraint graph can access any schema or instance data in the ASR.

The create method is used to create new variables, nodes, and links from which patterns and constraint graphs are constructed.

The store method is used to add these new elements to the ASR graph 1520.

The navigation methods are used to iterate through the valid bindings for variables belonging to an ASR cursor object. Valid bindings are bindings that:

Satisfy the variable's current restrictions.

Do not violate any of the conditions in the ASR cursor object's constraint graph.

Do not result in a violation of any restrictions on any other variables in the cursor object, with respect to the values of the nodes or links to which those variables are currently bound.

Which node or link is considered first, last, or next in the navigation order depends on the specified sort order. If no sort order is specified, the order in which bindings are returned is unspecified.

The navigation methods are findfirst, findlast, findnext, and findprevious.

The setvariable and unsetvariable methods are used to bind a variable to a specific node or link, and to unbind a variable so it is free to be bound to a different node or link. The access methods are used to retrieve the handle to a node or link and to retrieve the value of a node in the ASR graph 1520.

HRESULT IASRCursor::Create(HNODE hnVar, HNODE hnType, VARIANT val)

The create method creates a new node or link of type hnType and binds the specified variable (hnVar) to it. If the new node is of a type that takes a value, the value of the node is set to the value of the VARIANT passed as the val argument.

Because a variable is just a special type of node, a client 1550 can use this method to create new variables as well. (A variable is able to bind to another variable, in the same way it is able to bind to any other node.)

The create method does not store the newly created node or link in the ASR.

| Parameter | Description |
| --- | --- |
| hnVar | The handle to a variable that will be bound to the new node or link. |
| hnType | The handle to a node in the ASR that specifies the type of node or link to create. Generally, the new node or link is of the same type as the type constraint on the variable hnVar, but this parameter overrides it. |
| val | The value to assign to the newly created node. |

The create method can return the following values:

| Return value | Description |
| --- | --- |
| S_OK | Success. The node was created, but is not yet attached to the ASR graph. |

-continued

| Return value | Description |
| --- | --- |
| E_INVALIDARG | hnVar is not a valid node handle. |
| E_OUTOFMEMORY | There is not enough memory to complete the operation . . . |

HRESULT IASRCursor::Store(void)

The store method stores all new nodes and links that have been created since the last time the store method was invoked on a ASR cursor object.

If there are now new nodes or links to store, the store method returns success. The store method cannot be invoked on an ASR cursor object that is in the snapshot isolation mode, because it is not operating over data in the ASR.

The store method can return the following values:

| Return value | Description |
| --- | --- |
| S_OK | Success. All newly created nodes and links in this ASR cursor object have been stored in the ASR graph. |
| S_FALSE | There are no new nodes or links to store. |
| E_OUTOFMEMORY | There is insufficient memory to complete the operation. |
| TBD | The value assigned to one or more of the newly created nodes violates a restriction on the variable to which it the node is bound, or violates some other current restriction in the ASR cursor object. This error can also indicate that a value was assigned to a link. |

HRESULT FindFirst(HNODE hnVar)

The findfirst method binds the variable hnVar to the first node or link in the ASR graph, with respect to the current sort order, to which the variable can legally bind. A variable can only bind to a node or link of the type assigned to that variable. The node or link to which it binds must not violate any of the constraints on the ASR cursor object or any of the conditions imposed by the current bindings of other variables in the ASR cursor object.

| Parameter | Description |
| --- | --- |
| hnVar | The handle to a variable to be set to the first valid binding in its sort order. |

The findfirst method can return the following values:

| Return value | Description |
| --- | --- |
| S_OK | Success. hnVar is bound to the first node (or link) in its sort order that satisfies all current restrictions in the ASR cursor object. |
| S_FALSE | There are no nodes or links to which this variable can bind. |
| E_INVALIDARG | HnVar is not a valid node handle. |

HRESULT FindLast(HNODE hnVar)

The findlast method binds the variable hnVar to the last node or link in the ASR graph (with respect to the current sort order) to which the variable can legally bind. A variable can only bind to a node or link of the type assigned to that variable. The node or link to which it binds must not violate any of the constraints on the ASR cursor object or any of the conditions imposed by the current bindings of other variables in the ASR cursor object.

| Parameter | Description |
| --- | --- |
| hnVar | The handle to a variable to set to the last valid binding in its sort order. |

The findlast method can return the following values:

| Return value | Description |
| --- | --- |
| S_OK | Success. hnVar is bound to the last node (or link) in its sort order that satisfies all current restrictions in the ASR cursor object. |
| S_FALSE | There are no nodes or links to which this variable can bind. |
| E_INVALIDARG | hnVar is not a valid node handle. |

HRESULT FindNext(HNODE hnVar)

The findnext method binds the variable hnVar to the next node or link in the ASR graph (with respect to the current sort order) to which the variable can legally bind. A variable can only bind to a node or link of the type assigned to that variable. The node or link to which it binds must not violate any of the constraints on the ASR cursor object or any of the conditions imposed by the current bindings of other variables in the ASR cursor object.

| Parameter | Description |
| --- | --- |
| hnVar | The handle to a variable to set to the next valid binding in its sort order. |

The findnext method can return the following values:

| Return value | Description |
| --- | --- |
| S_OK | Success. hnVar is bound to the next node (or link) in its sort order that satisfies all current restrictions in the ASR cursor object. |
| S_FALSE | There are no more nodes or links in the sequence. |
| E_INVALIDARG | HnVar is not a valid node handle. |

HRESULT FindPrevious(HNODE hnVar)

The findprevious method binds the variable hnVar to the node or link in the current sequence of valid bindings that immediately precedes the node or link to which it is currently bound. A variable can only bind to a node or link of the type assigned to that variable. The node or link to which it binds must not violate any of the constraints on the ASR cursor object or any of the conditions imposed by the current bindings of other variables in the ASR cursor object.

| Parameter | Description |
| --- | --- |
| hnVar | The handle to a variable to be set to its previous valid binding. |

The findprevious method can return the following values:

| Return value | Description |
| --- | --- |
| S_OK | Success. hnVar is bound to the previous node (or link) in its sort order that satisfies all current restrictions in the ASR cursor object. |
| S_FALSE | There is no previous node or link in the sequence. This can occur if a node that had been visited previously has been detached from the graph, or if hnVar is bound to the first node in the sequence. |
| E_INVALIDARG | hnVar is not a valid node handle. |

HRESULT SetVariable(HNODE hnVar, HNODE hnInstance)

The setvariable method binds the variable hnVar to the node or link in the ASR specified by hnInstance. A variable can only bind to a node or link of the type assigned to that variable, or to a variable whose type is a subtype of the type assigned to the variable.

| Parameter | Description |
| --- | --- |
| hnVar | The handle to a variable. |
| hnInstance | The handle to a node or link in the ASR to which to bind the variable. |

The setvariable method can return the following values:

| Return value | Description |
| --- | --- |
| S_OK | Success. hnVar is bound to the specified node. |
| E_FAIL | Invalid HNODE. The requested node or link cannot be found, or this variable cannot bind to it. |
| E_INVALIDARG | Either hnVar or hnInstance is not a valid node handle. |

HRESULT UnSetVariable(HNODE hnVar)

The unsetvariable method sets a variable to the "Unspecified" state, in which the variable is no longer bound to any node or link in the ASR. If this method is invoked on a variable that is not currently bound to a node or link in the ASR graph, the method returns success and does nothing.

| Parameter | Description |
| --- | --- |
| hnVar | The handle to a variable |

The unsetvariable method can return the following values:

| Return value | Description |
| --- | --- |
| S_OK | Success. hnVar is no longer bound to any node or link in the ASR. |
| S_FALSE | The variable is not currently bound. |
| E_INVALIDARG | hnVar is not a valid node handle. |

HRESULT GetHandle(HNODE hnVar, HNODE *phnOut)

The gethandle method retrieves the handle to the node to which hnVar is currently bound. When the client no longer requires the handle, it must call IASR::ReleaseHandle to decrement the handle's reference count. If a client passes this handle to another object, it must invoke the IASR::AddRefHandle method to increment the reference count on the handle before passing it.

| Parameter | Description |
| --- | --- |
| hnVar | The handle to a variable. |
| phnOut | A pointer to the handle to the node or link to which the variable is bound. (Out parameter) |

The gethandle method can return the following values:

| Return value | Description |
| --- | --- |
| S_OK | Success. phnOut points to the handle to the node to which hnVar is bound. |
| S_FALSE | hnVar is not currently bound to any element. |
| E_INVALIDARG | hnVar is not a valid node handle or phnOut is a null pointer. |

HRESULT GetValue(HNODE hnVar, VARIANT *pVal)

The getvalue method retrieves the value of the node to which hnVar is currently bound.

| Parameter | Description |
| --- | --- |
| hnVar | The handle to a variable. |
| pVal | The value of the node to which the variable is bound. (Out parameter) |

The getvalue method can return the following values:

| Return value | Description |
| --- | --- |
| S_OK | Success. The VARIANT pointed to by pVal contains the value of the node to which hnVar is bound. |
| S_FALSE | There is no value to return. |
| E_INVALIDARG | Either hnVar is not a valid node handle or pVal is a null pointer. |

HRESULT SetValue(HNODE hnVar, VARIANT Val)

The setvalue method sets the value of the node to which hnVar is currently bound.

| Parameter | Description |
| --- | --- |
| hnVar | The handle to a variable. |
| Val | The value to assign to the node to which the variable is bound. |

The setvalue method can return the following values:

| Return value | Description |
| --- | --- |
| S_OK | Success. The node to which hnVar is bound now contains the value assigned to Val. |
| E_INVALIDARG | hnVar is not a valid node handle or Val does not contain a value. |

The system 1500 components, the ASR object 1510, the IASR interface 1530, the IASRCursor interface 1540, and the ASR cursor objects are embodied as computer hardware circuitry or as a computer-readable program, or a combination of both.

More specifically, in the computer-readable program embodiment, in varying embodiments, the programs are structured in an object-orientation using an object-oriented language such as Java, Smalltalk or C++, and the programs are structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), COM, Distributed Component Object Model (DCOM), Distributed System Object Model (DSOM) and Remote Method Invocation (RMI). The components execute on as few as one computer as in computer 110 in FIG. 1, or on at least as many computers as there are components.

The present invention allows a client 1550 to manage a linked list structure such as a graph using a cursor.

Figure 16:
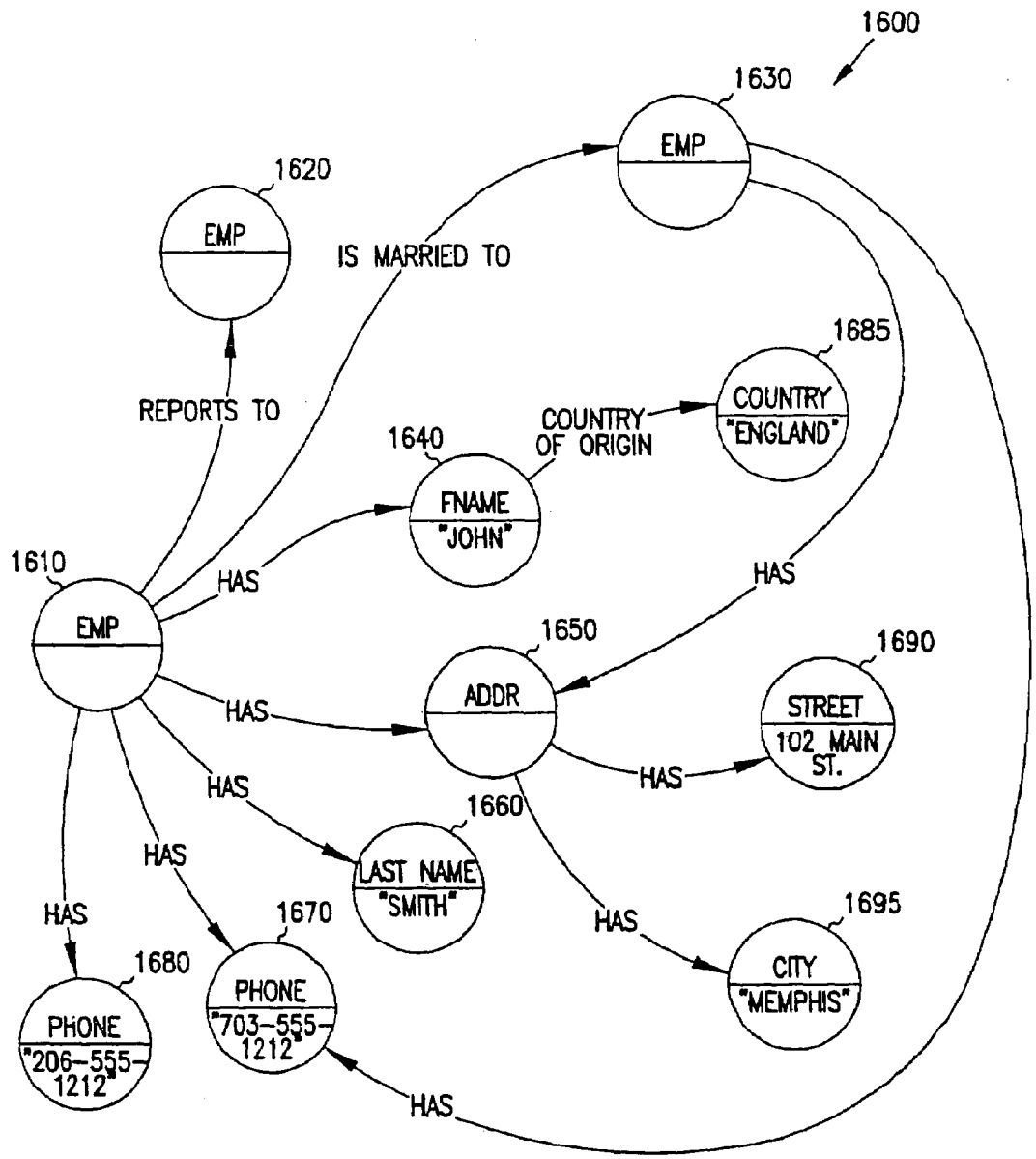
FIG. 16 is a block diagram illustrating a conventional exemplary graph.

FIG. 16 is a block diagram illustrating a conventional exemplary graph 1600. The graph includes a number of linked nodes. The links represent relationships.

More specifically, "emp" node of 1610 contains no text data, but does contain a link to "emp" node 1620 which the relationship between the two nodes is that "emp" node of 1610 "reports to" to "emp" node 1620, and "emp" node 1610 contains a link to "emp" node 1630 which the relationship between the two nodes is that "emp" node of 1610 "is married to" to "emp" node 1630. Furthermore, "emp" node 1610 contains a link to "fname" node 1640, containing the information "John." The relationship between the two nodes 1610 and 1640 is that "emp" node of 1610 "has a" "type2" node 1640. Moreover, "emp" node 1610 contains a link to "type3" node 1650 which the relationship between the two nodes is that "emp" node of 1610 "has a" "type3" node 1650. In addition, "emp" node 1610 contains a link to "lastname" node 1660 in which the relationship between the two nodes is that "emp" node of 1610 "has a" "lastname" node 1660. Continuing, "emp" node 1610 contains a link to "phone" node 1670 which the relationship between the two nodes is that "emp" node of 1610 "has a" "phone" node 1670, and "emp" node 1610 contains a link to another "phone" node 1680 which the relationship between the two nodes is that "emp" node of 1610 "has a" another "phone" node 1680.

In object-oriented implementations of graph 1600, each of the nodes is an object, of the class that the node is named for, such as "emp" or "type2."

Continuing, node 1640 that contains "John" is related by Relationship4 to node 1685. In addition, node 1650 has a "street" node 1690 containing the information "102 Main St." and node 1650 has a "city" node 1695 containing the information "Memphis."

In a graph, each piece of information is stored only once, in a node. A node that has a relationship with the information, will have a link to the node that contains the information. Therefore, there is no duplicated information. For example, "emp" node 1630 has a link to "phone" node 1670, and "emp" node 1610 contains "has a" link to "phone" node 1670. Therefore, the "phone" node 1670 information "703-555-1212" is stored in one location, node 1670, and is referenced from all required nodes, which eliminates duplication of the node 1670 information "703-555-1212."

Figure 17:
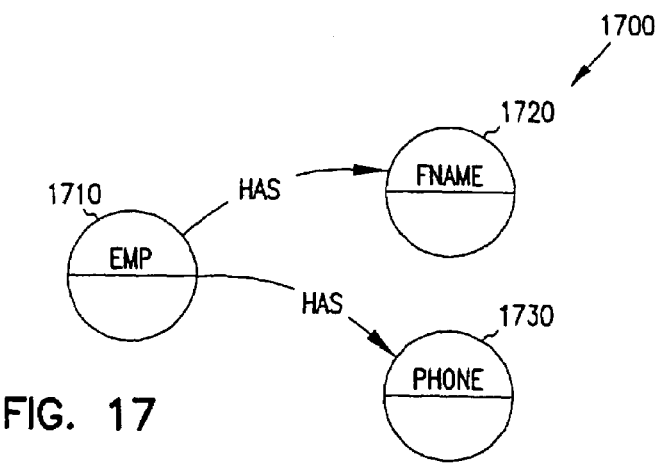
FIG. 17 is a block diagram illustrating a system-level overview of an exemplary embodiment of a pattern of the invention.

The present invention solves the problem of precisely navigating or querying graph 1600 so that unwanted data that does not fit the criteria of the search is not retrieved, and that all wanted data is retrieved. The present invention enables a pattern to be identified or generated, and the pattern to be located within the graph 1600. For example, if locating in the graph 1600 all employees which have a specific first name and that which have a specific phone is desired, then a pattern such as the pattern in FIG. 17 is generated and used to generate a spider in FIG. 18. The spider in FIG. 18 navigates and/or queries the graph in FIG. 16.

FIG. 17 is a block diagram illustrating a system-level overview of an exemplary embodiment of a pattern 1700 of the invention.

Navigation pattern 1700 is an association or a relationship of an "emp" node 1710 to a "fname" node 1720 and a "phone" node 1730. More specifically, the "emp" node 1710 "has a" "fname" node 1720 and "has a" "phone" node 1730.

Figure 18:
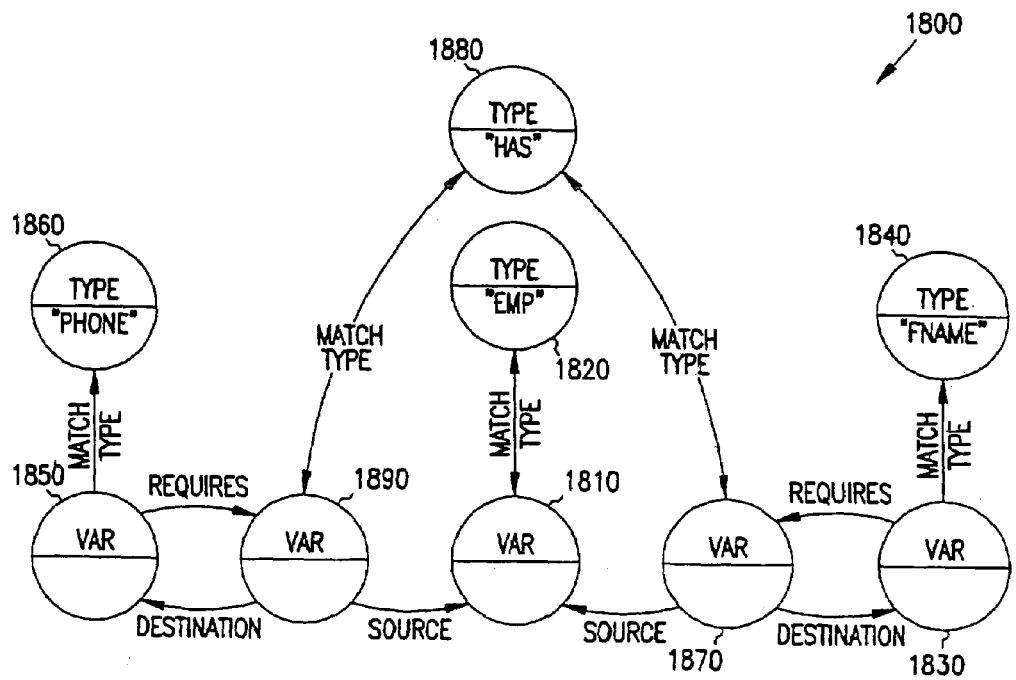
FIG. 18 is a block diagram illustrating a system-level overview of an exemplary embodiment of a spider of the invention.

FIG. 18 is a block diagram illustrating a system-level overview of an exemplary embodiment of a spider 1800 of the invention. Spider 1800 represents pattern 1700. In the creation of spider 1800 from pattern 1700, a number of variables are generated, one variable for each of the nodes in the pattern, and one variable for each of the relationships in the pattern.

More specifically, a variable 1810 is generated to represent "emp" node 1710 in pattern 1700. Node 1810 is linked or associated with "type" node 1820 containing data "emp" and the link or association is defined as a match type, indicating that spider 1800 represents a pattern which matches a node of "emp" type.

Furthermore, in the creation of spider 1800 from pattern 1700, a variable 1830 is generated to represent "fname" node 1720 in pattern 1700. Node 1830 is linked or associated with "type" node 1840 containing data "fname" and the link or association is defined as a match type, indicating that spider 1800 represents a pattern which matches a node of "fname" type.

In addition, in the creation of spider 1800 from pattern 1700, a variable 1850 is generated to represent "phone" node 1730 in pattern 1700. Node 1850 is linked or associated with "type" node 1860 containing data "phone" and the link or association is defined as a match type, indicating that spider 1800 represents a pattern which matches a node of "phone" type.

In addition, in the creation of spider 1800 from pattern 1700, a variable 1870 is generated to represent the "has" relationship between node 1710 and node 1720 in pattern 1700. Node 1870 is linked or associated with "type" node 1880 containing data "has" and the link or association is defined as a match type, indicating that spider 1800 represents a pattern which matches a relationship of "has" type. Furthermore, variable 1870 is linked, associated or related to variable 1810 in the spider with a "source" link, association or relationship to indicate that the source of the "has" relationship that variable 1870 represents in pattern 1700 is variable 1810 which represents the "emp" node in pattern 1700. Also, variable 1870 is linked, associated or related to variable 1830 in the spider with a "requires" link, association or relationship, and a "destination" link, association or relationship to indicate that the source of the "destination" of the variable 1870 is variable 1830 which represents the "fname" node in pattern 1700.

In addition, in the creation of spider 1800 from pattern 1700, a variable 1890 is generated to represent the "has" relationship between node 1710 and node 1730 in pattern 1700. Node 1890 is linked or associated with "type" node 1880 containing data "has" and the link or association is defined as a match type, indicating that spider 1800 represents a pattern which matches a relationship of "has" type. Furthermore, variable 1890 is linked, associated or related to variable 1810 in the spider with a "source" link, association or relationship to indicate that the source of the "has" relationship that variable 1890 represents in pattern 1700 is variable 1810 which represents the "emp" node in pattern 1700. Also, variable 1890 is linked, associated or related to variable 1830 in the spider with a "requires" link, association or relationship, and a "destination" link, association or relationship to indicate that the source of the "destination" of the variable 1890 is variable 1830 which represents the "phone" node in pattern 1700.

Conclusion

A mechanism for providing a high degree of abstraction of graphs has been described that has at least one a variable that binds to nodes or links in a graph.

The present invention is directed to providing a higher degree of association between nodes and links in a graph by creating data structures (spiders) that provide views into graphs that transcend the relatively static association of a conventional graph. A spider's variables bind to any number of nodes and links in the graph, enabling all of the bound nodes and links by addressing the spider. By adding constraints on the extent or degree of binding in a spider to a graph, a subset of the graph is identified. The spider can then used to address the subset of the graph as constrained by the spider. A spider can bind to a link in order to identify a parent/child structural subset of the graph. More specifically a spider is a collection of variables that create a template or pattern and bind to the nodes and links in the graph. A spider traverses a graph by binding its variables to various nodes and links in the graph.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the PPT schema and object-oriented implementation is used for exemplary purposes.

The terminology used in this application with respect to is meant to include all of these environments. Therefore, it is manifestly intended that this invention be limited only by the following claims and equivalents thereof.

We claim:

1. One or more computer-readable media including at least one tangible component, and having computer-executable instructions that, when executed by a computer, perform a method for managing a graph so that a subset of data of the graph which represents wanted data is indicated in response to a query, the method comprising:
   generating a cursor of the graph;
   navigating through the graph using the cursor;
   generating a constraint graph which can be used to identify the subset of data, the constraint graph having at least one constraint on the managing of the graph and wherein the generating the cursor further comprises the cursor being associated with the constraint graph;
   wherein the generating the constraint graph further comprises:
      obtaining a handle to a required namespace node, yielding a namespace handle;
      obtaining a handle to a variable using the namespace handle;
      determining the identity of each of a plurality of nodes and links associated with the namespace handle;
      obtaining a handle to each of the plurality of nodes and links using the namespace handle;
      generating a segment; and
      storing the segment; and
   indicating the subset of data identified by the constraint graph in response to the query.

2. One or more computer-readable media including at least one tangible component, and having computer-executable instructions that, when executed by a computer, perform a method for managing a graph so that a subset of data of the graph which represents wanted data is indicated in response to a query, the method comprising:
   generating a cursor of the graph;
   navigating through the graph using the cursor, wherein the graph comprises a linked list which includes a collection of variables bound to nodes and links using a restriction which represents a constraint graph, wherein the constraint graph can be used to identify the subset of data, and wherein the navigating through the graph using the cursor further comprises:
      binding a variable to the first instance of the plurality of nodes and links;
      binding a variable to the last instance of the plurality of nodes and links;
      binding a variable to the next instance of the plurality of nodes and links; and
      binding a variable to the previous instance of the plurality of nodes and links; and
   indicating the subset of data identified by the constraint graph in response to the query.

3. One or more computer-readable media including at least one tangible component, and having computer-executable instructions that, when executed by a computer, perform a method for managing a graph so that a subset of data of the graph which represents wanted data is indicated in response to a query, the method comprising:
   generating a cursor of the graph;
   navigating through the graph using the cursor, wherein the graph comprises a linked list which includes variables bound to nodes and links using a restriction which represents a constraint graph, and wherein the constraint graph can be used to identify the subset of data;
   retrieving information from the graph;
   setting the value of a node that a specified variable is bound;

beginning an atomic transaction;
ending the atomic transaction;
committing a current atomic transaction;
aborting the current atomic transaction;
cloning the cursor;
entering a snapshot mode;
refreshing the snapshot mode;
locking the node;
locking a pattern;
specifying a level of authorization and access permission in levels of granularity;
mapping a link and the node to a data source;
specifying a variable to receive notification of change;
specifying the pattern to receive notification of change; and
indicating the subset of data identified by the constraint graph in response to the query.

* * * * *